US009798455B2

(12) United States Patent
Ban et al.

(10) Patent No.: US 9,798,455 B2
(45) Date of Patent: Oct. 24, 2017

(54) OPERATING DEVICE

(71) Applicant: Panasonic Intellectual Property Management Co., Ltd., Osaka-shi, Osaka (JP)

(72) Inventors: Yasuhiro Ban, Shiga (JP); Naoki Yamasaki, Hyogo (JP); Keiko Noda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 329 days.

(21) Appl. No.: 14/418,061

(22) PCT Filed: Sep. 27, 2013

(86) PCT No.: PCT/JP2013/005786
§ 371 (c)(1),
(2) Date: Jan. 28, 2015

(87) PCT Pub. No.: WO2014/068845
PCT Pub. Date: May 8, 2014

(65) Prior Publication Data
US 2015/0169194 A1    Jun. 18, 2015

(30) Foreign Application Priority Data

Oct. 29, 2012 (JP) ................................. 2012-237543
Mar. 13, 2013 (JP) ................................. 2013-050026

(51) Int. Cl.
*G06F 3/0482* (2013.01)
*G06F 3/0484* (2013.01)
(Continued)

(52) U.S. Cl.
CPC .......... *G06F 3/04842* (2013.01); *D06F 33/02* (2013.01); *D06F 39/005* (2013.01);
(Continued)

(58) Field of Classification Search
CPC ........ G06F 3/0482; D06F 33/02; D06F 39/005
See application file for complete search history.

(56) References Cited

U.S. PATENT DOCUMENTS

| 5,279,134 | A   | 1/1994 | Nonogaki et al. |
|-----------|-----|--------|-----------------|
| 8,139,255 | B2* | 3/2012 | Matsunaga ........ H04N 1/40068 358/1.16 |

(Continued)

FOREIGN PATENT DOCUMENTS

| GB | 2262820 A  | * | 6/1993 | ............. G05B 19/10 |
|----|------------|---|--------|------------------------|
| GB | 2 279 969 A |   | 1/1995 |                        |

(Continued)

OTHER PUBLICATIONS

Extended European Search Report in corresponding European Application No. 13850472.5, dated Aug. 4, 2015, 6 pages.

(Continued)

*Primary Examiner* — Phenuel Salomon
(74) *Attorney, Agent, or Firm* — Brinks Gilson & Lione

(57) ABSTRACT

An operation display part according to the present invention includes a GUI display portion which displays each of display images having a size in a horizontal direction correlated with a duration of an operating time of each of the steps, a touch operating portion which extends or shortens the size of each of the display images, a controller which determines an operating time of each step based on the operating time corresponding to the size of each of the display images, and a memory which stores information of a settable range of the operating time of each steps set for each washing course, wherein, when an operating time of a step included in a predetermined washing course is set in the predetermined washing course, the GUI display portion displays the settable range of the operating time of this washing course as a range in a horizontal direction together with the display images. Consequently, in an electric (Continued)

machine and appliance which executes an operation action selected from a plurality of operation actions including a plurality of steps, it is possible to display a settable range of an operating time of each step of this selected operation action.

9 Claims, 27 Drawing Sheets

(51) Int. Cl.
D06F 33/02 (2006.01)
D06F 39/00 (2006.01)

(52) U.S. Cl.
CPC .... *D06F 2202/10* (2013.01); *D06F 2204/065* (2013.01); *D06F 2216/00* (2013.01)

(56) References Cited

U.S. PATENT DOCUMENTS

| | | | | |
|---|---|---|---|---|
| 8,214,761 B2* | 7/2012 | Sasaki | ................ | H04N 1/00416 715/811 |
| 2005/0099645 A1* | 5/2005 | Saito | ..................... | G06F 3/1205 358/1.13 |
| 2006/0184122 A1* | 8/2006 | Nemoto | ................ | A61M 5/007 604/154 |
| 2007/0177907 A1 | 8/2007 | Hashimoto et al. | | |
| 2008/0002237 A1* | 1/2008 | Matsunaga | ........ | H04N 1/40068 358/471 |
| 2009/0091547 A1* | 4/2009 | Kikuoka | ............. | G06F 3/04886 345/173 |
| 2011/0074707 A1* | 3/2011 | Watanabe | ........... | G06F 3/03547 345/173 |
| 2012/0044172 A1* | 2/2012 | Ohki | ................... | G06F 3/04883 345/173 |
| 2012/0306881 A1 | 12/2012 | Nemoto | | |
| 2013/0091447 A1* | 4/2013 | Kang | ................. | G06F 3/04886 715/764 |
| 2013/0303903 A1 | 11/2013 | Nemoto | | |
| 2014/0022254 A1* | 1/2014 | Shiohama | ......... | G01N 35/0092 345/440 |
| 2014/0192013 A1* | 7/2014 | Lubert | .................... | G06F 3/044 345/174 |

FOREIGN PATENT DOCUMENTS

| | | |
|---|---|---|
| JP | H07-075697 A | 3/1995 |
| JP | 2007-19962 A | 1/2007 |
| JP | 2007-199623 A | 8/2007 |
| WO | WO 2010/128733 A1 | 11/2010 |
| WO | WO2010128733 * 11/2010 | ............. D06F 39/00 |

OTHER PUBLICATIONS

International Search Report in corresponding International Application No. PCT/JP2013/005786, dated Dec. 24, 2013, 2 pages.

Office Action and English language translation of Search Report, in corresponding Chinese Application No. 201380040885.1, dated Mar. 30, 2016, 11 pages.

Office Action, and English language translation thereof, in corresponding Japanese Application No. 2014-544224, dated Jul. 31, 2017, 8 pages.

* cited by examiner

1 Housing
2 Door
3 Door open button
4 Operation display part
5 Detergent case

OPERATING DEVICE

This application is a 371 application of PCT/JP2013/005786 having an international filing date of Sep. 27, 2013, which claims priority to JP2012-237543 filed Oct. 29, 2012 and JP2013-050026 filed Mar. 13, 2013, the entire contents of which are incorporated herein by reference.

TECHNICAL FIELD

The present invention relates to an operating device including a GUI operator operated by a touch panel (touch-screen).

BACKGROUND ART

Conventionally, there is used a washing machine which includes an operation panel having various operation buttons and operation keys. For example, there is developed a washing machine including a display device which displays a washing course including a series of steps such as washing, rinsing and spin-drying on a screen of an operation panel, and a surface touch detector which detects a touch on each step portion displayed on the screen, and which can change a setting of a step portion for which a touch is detected, based on a detection result of this screen touch detector (e.g. PTL 1). This washing machine can cause the display device to simultaneously display a state after a setting of this step portion is changed when changing the setting of the step portion for which the touch is detected.

Meanwhile, when a user causes a home appliance to operate based on a manual setting according to a user's preference, generally, various setting items are set using an input section such as a switch, and the operation is started. For example, a washing machine usually carries out an operation action by setting an operation strength or setting an operating time according to an amount or fabric quality of clothes as washing targets.

More specifically, setting the operation strength of the washing machine includes setting a washing method such as the number of times of rotations of a motor which rotates a pulsator provided in a washing tub and a reversing action, and setting a water temperature in the case of an example of a washing step. Further, setting an operating time is to set a time to execute a washing step. Meanwhile, in the case of an example of a rinsing step, setting an operation strength is to set a rinsing method of rinsing clothes while pouring water or the like. Further, setting an operating time is to set the number of times of rinsing, for example. Setting the strength of a spin-drying step is to set the number of times of rotations of a motor of a washing tub, and setting a time is to set a spin-drying time.

CITATION LIST

Patent Literature

PTL 1: Japanese Patent Application Laid-Open No. 05-168792

SUMMARY OF INVENTION

Technical Problem

Meanwhile, according to the conventional configuration disclosed in PTL 1, when each washing course such as "standard", "stubborn stain" and "wool" is set, an operating time and the number of times of operations of each step of the set course are colored in a circular graph and displayed on a display device. Further, by touching an indication of a step portion which needs to be set, it is possible to display a setting state of an operating time or the number of times of operations of the step reduced by the number of times of touches or a touching time. However, according to this conventional configuration, it is not possible to display a settable range of an operating time of each step suitable for a selected washing course. That is, according to the conventional configuration, a user's setting range is uniformly fixed irrespectively of a type of a washing course. Further, there is employed a configuration of displaying the operating time of each step within this fixed range according to each washing course. According to this configuration, for example, when a setting is changed to extend only an operating time of a given step, it is not possible to know a settable range of an operating time in this step matching a currently selected washing course. Therefore, there is a problem that setting an operating time of each step of a washing course is not convenient.

Further, according to the conventional configuration disclosed in PTL 1, it is possible to know how setting values of a maximum setting time and a maximum number of times of each step displayed as a circular graph are set. However, there are problems that it is difficult to intuitively understand the entire time required for washing and to what degree a setting time is set to each step, and is difficult to perform an operation.

The present invention has been made in light of the above problem. An object of the present invention is to provide an operating device which can display, in an electric machine and appliance which executes an operation action selected from a plurality of operation actions including a plurality of different steps, a settable range of an operating time of each step of this selected operation action.

Solution to Problem

To solve the above problem, an operating device according to the present invention is an operating device which sets each of a plurality of steps in an electric machine and appliance which executes an operation action selected from a plurality of operation actions including the plurality of steps, the operating device including: a first display portion which displays each of first display images having a size in a first direction correlated with a duration of an operating time of each of the steps; a first operating portion which extends or shortens the size of each of the first display images in the first direction displayed on the first display portion in response to a user's operation input; an operating time determination part which determines the operating time of each step according to the size of each of the first display images in the first direction displayed on the first display portion; and a first memory which stores information of a settable range of the operating time of each of the steps set for each of the operation actions, wherein, when an operating time of a step included in a predetermined operation action is set in the predetermined operation action, the first display portion displays, based on the information stored in the first memory, a settable range of the operating time of the step in the predetermined operation action as a range of the first direction together with each of the first display images.

Advantageous Effects of Invention

An operating device according to the present invention having the above configuration provides an effect of displaying, in an electric machine and appliance which executes an operation action selected from a plurality of operation actions including a plurality of steps, a settable range of an operating time of each step of this selected operation action.

DETAILED DESCRIPTION OF THE PREFERRED EMBODIMENTS

Figure 1:
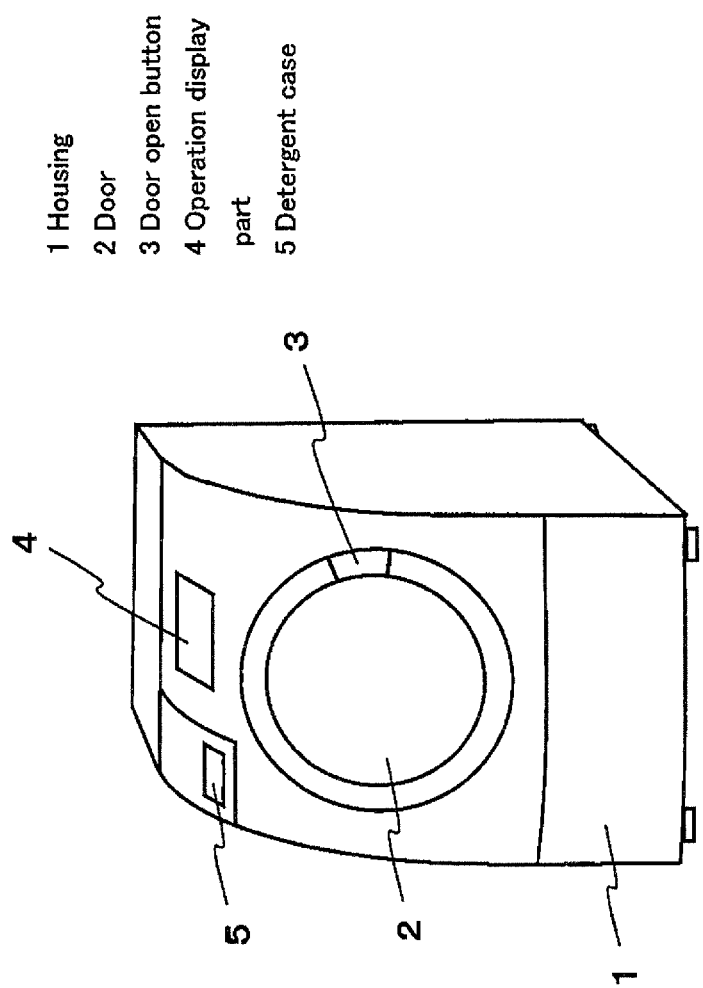
FIG. 1 is a view illustrating an example of an external configuration of a washing machine having an operation display part according to an embodiment of the present invention.

An operating device according to a first aspect of the present invention is an operating device which sets each of a plurality of steps in an electric machine and appliance which executes an operation action selected from a plurality of operation actions including the plurality of steps, the operating device including: a first display portion which displays each of first display images having a size in a first direction correlated with a duration of an operating time of each of the steps; a first operating portion which extends or shortens the size of each of the first display images in the first direction displayed on the first display portion in response to a user's operation input; an operating time determination part which determines the operating time of each step according to the size of each of the first display images in the first direction displayed on the first display portion; and a first memory which stores information of a settable range of the operating time of each of the steps set for each of the operation actions, wherein, when an operating time of a step included in a predetermined operation action is set in the predetermined operation action, the first display portion displays, based on the information stored in the first memory, a settable range of the operating time of the step in the predetermined operation action as a range of the first direction together with each of the first display images.

According to the above configuration, the operating device includes the first display portion and the first operating portion. Consequently, the operating device can express an operating time of a selected operation action at a size of each of the first display images, and appropriately change the size of each of the first display images in the first direction. Further, the operating device includes the operating time determination part and, consequently, can determine the operating time according to the size of each of the first display images in the first direction range. Consequently, the electric machine and appliance can carry out an operation of each step in the determined operating time. Accordingly, the electronic machine and appliance can change the operating time of each step by causing the first operating portion to extend or shorten the size of each of the first display images in the first direction.

Further, when the operating time is set by extending or shortening the size of each of the first display images of each step in the first direction, it is possible to display information related to a settable range of the operating time stored in the first memory. Consequently, when the operating time is set, it is possible to display the settable range of the operating time of each step of a selected operation action.

Accordingly, the operating device according to the present invention provides an effect of displaying, in an electric machine and appliance which executes an operation action selected from a plurality of operation actions including a plurality of steps, a settable range of the operating time of each step of the selected operation action.

Further, in the above first aspect, the operating device according to a second aspect of the present invention further includes: a second display portion which displays each of second display images having a size in a second direction correlated with a degree of a strength related to a function executed in each of the steps, the second direction being different from the first direction; a second operating portion which extends or shortens in the second direction the size of each of the second display images displayed on the second display portion in response to a user's operation input; a strength determination part which determines the strength related to the function executed in each step according to a size of each of the second display images in the second direction displayed on the second display portion; and a second memory which stores information of a settable range of the strength set for each of the operation actions and related to the function executed in each step, wherein, when the strength related to the function of a step included in a predetermined operation action is set in the predetermined operation action, the second display portion displays, based on the information stored in the second memory, a settable range of the strength in the predetermined operation action as a range of the second direction together with each of the second display images.

The strength related to the function described herein means a value which can be determined based on output power defining the number of times of rotations of a motor rotated in a washing tub when, for example, the electric machine and appliance is a washing machine and the function is a washing function of the washing machine.

According to the above configuration, the operating device includes the second display portion and the second operating portion. Consequently, the operating device can express the strength related to the function executed in each step of a selected operation action at a size of each of the second display images, and appropriately change the size of each of the second display images in the second direction.

Further, the operating device includes the strength determination part. Consequently, the operating device can determine the strength of the function executed in each step at a strength corresponding to the size of each of the second display images. Consequently, the electric machine and appliance can execute the function performed in each step at the determined strength. Accordingly, the electronic machine and appliance can change of the strength related to the function executed in each step by causing the second operating portion to extend or shorten the size of each of the second display images in the second direction.

Note that, the second direction is a direction different from the first direction.

Consequently, even when the first display image and the second display image are displayed as one common display image, it is also possible to set the strength related to the function in addition to an operating time.

Further, when the strength related to the function is set by extending or shortening the size of each of the second display images of each step in the second direction, it is possible to display information related to a settable range of the strength of the function stored in the second memory. Consequently, when the strength of the function is set, it is possible to display the settable range of the strength of the function executed in each step of a selected operation action.

Accordingly, the operating device according to the present invention provides an effect of displaying, in an electric machine and appliance which executes an operation action selected from a plurality of operation actions including a plurality of steps, a settable range of the strength of the function executed in each step of this selected operation action.

Further, in the above second aspect, the operating device according to a third aspect of the present invention may further include: a third memory which, when the size of one of the first display images and the second display images is changed, stores a change amount of the size of the other which is changed in conjunction with the changed size; and a third display portion which, when the size of one of the first display images and the second display images is changed, reads from the third memory the change amount of the size of the other which is changed in conjunction with the changed size, and displays the change amount.

According to the above configuration, the operating device includes the third memory and the third display portion. Consequently, when the size of one of the first display images and the second display images is changed, it is possible to display the size of the other display image which is changed by a change amount in conjunction with this change. Consequently, only by changing the size of one display image, it is possible to automatically change another setting item different from a setting item correlated with this display image. Consequently, it is possible to reduce man-hours required for a setting.

Further, in the above third aspect, the operating device according to a fourth aspect of the present invention may employ a configuration in which, when the first operating portion sets an operating time by extending or shortening the size of each of the first display images in the first direction, a predetermined unit at which the first display image is extended or shortened is displayed, and when the second operating portion sets the strength by extending or shortening the size of each of the second display images in the second direction, the second display portion displays a predetermined unit at which each of the second display images is extended or shortened.

Furthermore, in the above fourth aspect, the operating device according to a fifth aspect of the present invention may employ a configuration in which, in the first display portion and the second display portion, a unit which represents the settable range is varied according to a step of extending and shortening the size of each of the first display images and the size of each of the second display images by the first operating portion and the second operating portion.

Hereinafter, preferred embodiments of the present invention will be described with reference to the drawings. Note that these embodiments by no means limit the present invention. Note that the same components will be denoted by the same reference numerals, and descriptions thereof will be omitted.

Figure 2:
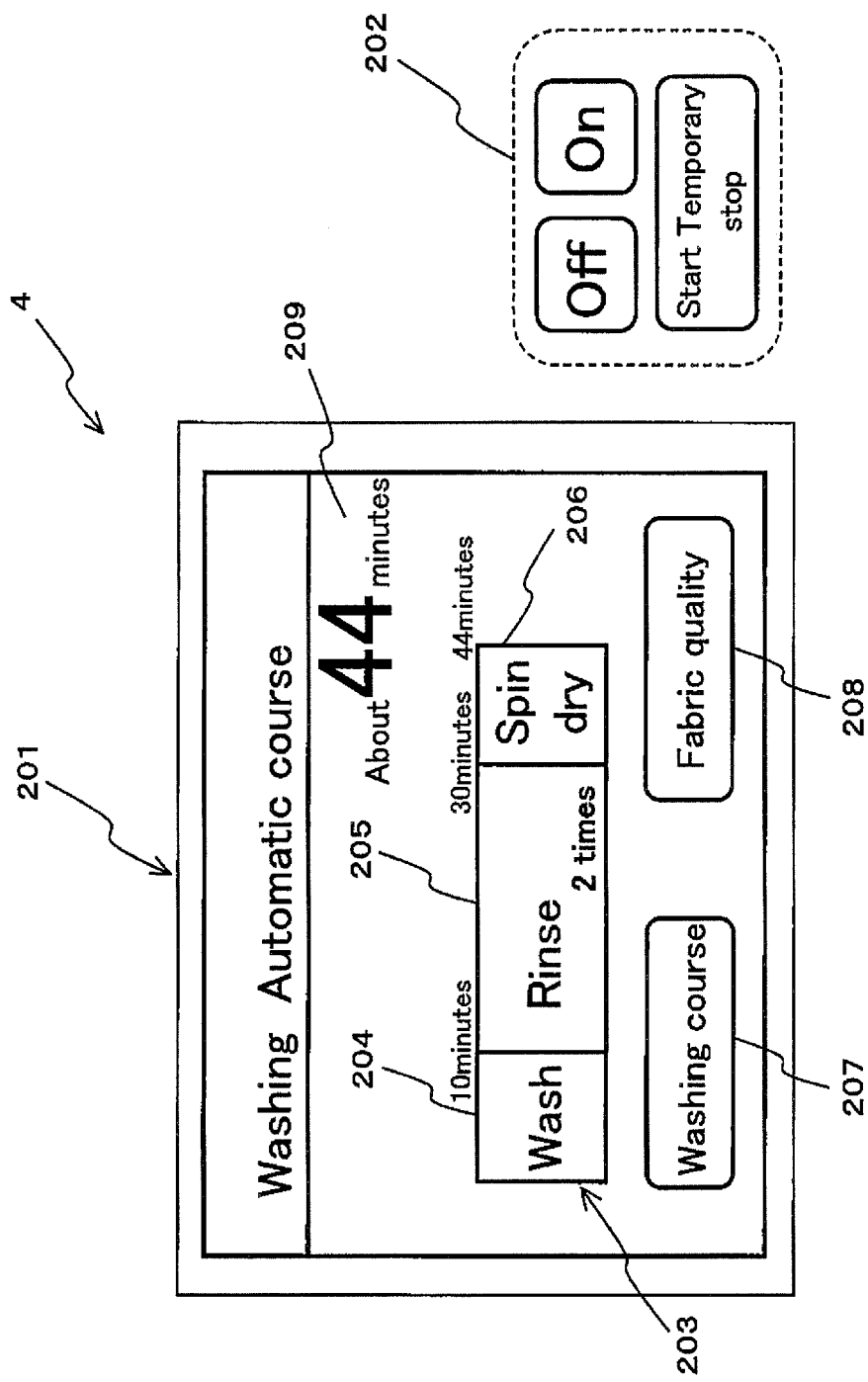
FIG. 2 is a view illustrating the operation display part of the washing machine according to the embodiment of the present invention.
Figure 3:
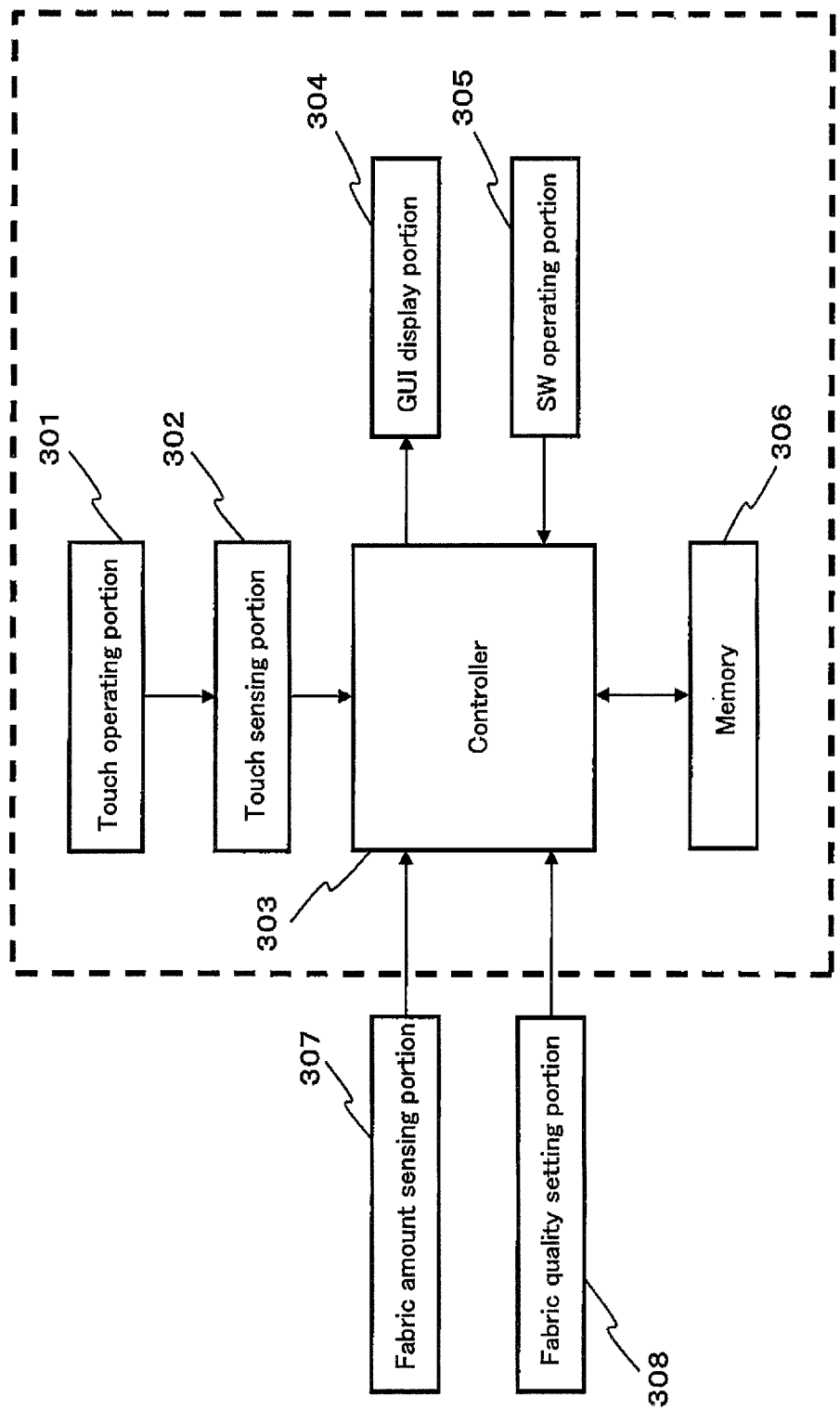
FIG. 3 is a block configuration diagram of the operation display part according to the embodiment of the present invention.

FIG. 1 is a view illustrating an example of an external configuration of a washing machine having an operation display part (operating device) 4 according to an embodiment of the present invention. FIG. 2 is a view illustrating the operation display part 4 of the washing machine according to the embodiment of the present invention. FIG. 3 is a block configuration diagram of the operation display part 4. A configuration according to the present embodiment will be described with reference to FIGS. 1, 2 and 3. Note that, a washing machine will be described as an example of home appliances among electric machines and appliances having the operation display part (operating device) 4 in the present embodiment. However, the present invention is not limited to such a washing machine.

As illustrated in FIG. 1, the washing machine is configured by a washing machine housing 1, a door 2, a door open button 3, the operation display part 4 and a detergent case 5. Note that the operation display part 4 realizes the operating device according to the present invention.

The washing machine according to the present embodiment is, for example, a drum-type washing machine, which washes clothes put in a drum through the door 2 provided in a front surface of the washing machine housing 1 which is an exterior of the washing machine. The door 2 is configured such that the door 2 is opened by pushing the door open button 3 provided at a side of the door 2, and is manually closed to a position at which this door 2 is locked when the door 2 is closed.

After putting clothes to be washed in the drum of the washing machine, a user operates the operation display part 4 and makes a setting and an instruction related to a washing operation. Although not illustrated in detail, power is turned on by pushing a power-on key of a key operator 202 described later, a washing course is set by touching a washing course selection button 207 of the operation display part 4, and fabric quality of the clothes is set by touching a fabric quality setting button 208. Further, although not illustrated in particular, various settings such as a water level are made by touching other setting buttons. When making various settings is finished, washing is started by pushing a start key of the key operator 202. Settable washing courses (operation actions) of the washing machine according to the present embodiment include, for example, an "automatic course", an "express course", a "scrubbing course" and a "night course" set in advance, but the courses are not limited thereto. The "automatic course" is a course set in advance as a course which executes a standard washing operation. The "express course" is a course set in advance as a course whose operating time is shortened compared to the standard washing operation. The "scrubbing course" is a course selected to wash clothes having many stains. According to the "scrubbing course", washing performance with respect to stains is enhanced by increasing a load to be applied to clothes by increasing the number of times of rotations of clothes to be rotated in the washing tub compared to the standard washing operation, and increasing a rotation time. The "night course" is a course selected for the purpose of washing clothes while suppressing sound at night. As compared to the standard washing operation, the "night course" is configured to suppress sound caused by the operation (e.g. driving sound of a motor caused when clothes are rotated or sound of water caused when water is poured).

Further, fabric quality is set to wash delicate clothes (wool or cashmere sweaters) made of fibers which need to be dry-cleaned or hand-washed, blankets or comforters. The washing machine performs an operation by changing a washing control method according to the fabric quality setting. Further, the water level is set to three types, i.e., automatic, high and low.

The washing operation of the washing machine according to the present embodiment includes three different steps of washing, rinsing and spin-drying. One of these steps is the first step according to the present invention, and another step different from this first step is the second step according to the present invention. Each step is configured such that the strength of a washing operation, and an operating time or the number of times of operations are set according to a washing course, an amount of clothes and a fabric quality setting value. For example, when an agitating method of the washing machine is a drum-type, the strength of a washing operation can be determined based on an amount of output power which defines the number of times of rotations of a motor which is rotated in a washing tub. Further, for example, when an agitating method of a washing machine is a pulsator type, the strength of a washing operation is a value which can be determined based on output power defining the number of times of rotations of a motor which rotates a rotating vane (pulsator) provided in a washing tub. When the number of times of rotations of the motor is higher, the strength is higher. In contrast, when the number of times of rotations of the motor is lower, the strength is lower. Information related to the strength of a washing operation, an operating time and the number of times of operations is stored in a memory (a memory 306 described later) provided in a control circuit of the washing machine in advance. Further, the user can change an operating time of a washing step, the number of times of operations of the rinsing step and an operating time of the spin-drying step corresponding to each washing course. In the rinsing step, one operation action includes a series of actions of pouring water in the washing tub, rotating and rinsing clothes, and discharging all the water stored in the washing tub. Hence, for the rinsing step in the present embodiment, an action amount is defined based on the number of times of operations instead of an operating time.

Further, the rinsing step includes water-saving rinsing (standard rinsing method) of performing rinsing while storing water in the drum, and water-pouring rinsing of performing rinsing while pouring water. A rinsing method varies depending on a washing course. Further, the rinsing method can also be changed by a user's setting. In the case of water-saving rinsing, one operation action includes a series of actions of pouring water in the washing tub, and rotating and rinsing the clothes after a predetermined amount of water is stored, and then, discharging all the water stored in the washing tub. In contrast, in the case of water-pouring rinsing, clothes are rotated and rinsed while pouring water in the washing tub. In this case, supplied water is discharged from the washing tub. However, supplied water is not completely discharged from the washing tub, and therefore, when clothes are rinsed for a fixed period of time while water is poured, pouring water and rotating clothes are stopped, and all the water stored in the washing tub is discharged. A series of actions described above is one operation action.

When making various settings such as a setting of a washing course is finished, the washing machine starts washing in response to pushing of the start key. Further, when washing is started, the washing machine senses the amount of clothes to be washed, and supplies water corresponding to the amount of clothes (not illustrated). Furthermore, a detergent amount is displayed on the operation display part 4 according to the water supply amount, and then the user loads a detergent to the detergent case 5 according to the displayed detergent amount. At the same time, the user loads softener as necessary.

The operation display part 4 according to the present embodiment is configured to display GUIs (Graphical User Interface, hereinafter referred to as a GUI) on full dot liquid crystal, and allow an operation to be performed by a capacitive touch panel provided on the full dot liquid crystal. When detecting a user's finger on the capacitive touch panel, the operation display part 4 determines the position of the user's finger. For example, when determining that the finger position is in a range of the washing course selection button 207 represented by a GUI, the washing machine determines that the washing course selection button 207 is pushed, and makes a setting and an instruction corresponding to the washing course selection button 207.

(External Structure of Operation Display Part)

Hereinafter, an example of an external structure of the above operation display part 4 will be described with reference to FIG. 2.

The operation display part 4 illustrated in FIG. 2 includes a GUI operation display part 201, the key operator 202, a step setting part 203, a wash button 204, a rinse button 205, a spin-dry button 206, the washing course selection button 207, the fabric quality setting button 208 and an operating time display part 209.

The GUI operation display part 201 is configured by full dot liquid crystal and a capacitive touch panel. The GUI operation display part 201 displays, on a liquid crystal display screen, display images showing various GUI buttons such as the key operator 202, the step setting part 203, the wash button 204, the rinse button 205, the spin-dry button 206, the washing course selection button 207 and the fabric quality setting button 208 and, in addition, a display image showing the operating time display part 209. Further, the GUI operation display part 201 performs a setting operation of the washing machine corresponding to a touched GUI button according to a user's touch operation on one of the displayed GUI buttons. Note that the touch operation according to the present embodiment is an operation of touching a GUI button displayed on the GUI operation display part 201 by the finger or pushing a button.

The key operator 202 is configured by a tactile switch known as, for example, a tact switch (registered trademark). A membrane film and button keys are attached to a housing surface, and a control signal is inputted to the washing machine when the tactile switch is pushed. The key operator 202 includes three keys, i.e., a power-on key for turning on the power, a power-off key for turning off the power, and a start key for starting or temporarily stopping a washing operation. Three keys are provided as input sections independently from various GUI buttons of the GUI operation display part 201, and are configured to turn on the power, turn off the power, or start or temporarily stop washing at all times.

The step setting part 203 is configured by setting buttons of three steps (washing, rinsing and spin-drying) of a washing operation, and is configured to display an operating time of each step according to sizes of display images of these setting buttons. That is, a size of each display image (display images of the wash button 204, the rinse button 205, and the spin-dry button 206) of the setting button of each step is correlated with a duration of the operating time of each step.

The size changes in a predetermined direction (a time axis direction, i.e., a first direction) in response to a change of the setting of the operating time. For example, when the step setting part 203 performs an operation of dragging a display image of a setting button of each step in a horizontal direction matching with the time axis direction, it is possible to change the duration of the operating time of each step.

This time axis direction corresponds to the first direction according to the present invention. The dragging operation described herein is an operation of shifting, moving and pulling an operation target on a screen in a state where the operation target is touched. Thus, the user can intuitively recognize the duration of the operating time based on the length (size) of the display image of each setting button, and intuitively understand how much time is taken by each step. Further, during the operation, a color of a completed step changes according to a remaining time, so that it is possible to visually understand how much the washing operation has progressed.

A controller (operating time determination part) 303 described later determines an operating time of each step according to the size of the setting button of each step. Further, the controller 303 notifies the determined operating time to a washing machine controller (not illustrated) which controls various operations of the washing machine. During the notified operating time, the washing machine controller performs control to execute an operation corresponding to a predetermined step of the washing machine.

In addition to the setting of the operating time of each step as described above, each setting button enables setting of a strength (strength setting) related to a function of each step by a user's touch operation. That is, in the setting button of each step, there is displayed a display image whose size correlated with the strength related to the function of each step is defined. Further, by performing an operation of dragging this display image in each setting button in a vertical direction (second direction) and extending or shortening the length of the display image, the setting of the strength of each step can be changed. Thus, it is possible to change a strength setting level by extending the length of the display image in each setting button in the vertical direction. Consequently, the user can intuitively recognize that the strength setting level is changed. As described later, the controller (strength determination part) 303 determines the strength related to the function to be executed in each step according to the size of the display image in the setting button in each step. Further, the controller 303 notifies the determined strength related to the function of each step, to the washing machine controller (not illustrated) which controls various operations of the washing machine. According to the notified strength, the washing machine controller performs control to execute an operation corresponding to a predetermined step of the washing machine.

Each of the wash button 204, the rinse button 205 and the spin-dry button 206 is a GUI button which functions as an input portion which sets each step of the washing operation. These three GUI buttons function as the input sections, and indicate an operating time (washing or spin-drying) or the number of times of operations (rinsing) of each step according to the length of a GUI button display image (the length of the GUI button display image which goes along the time axis and is a horizontal direction length in the figure). Further, the total lengths obtained by adding these three GUI button indications indicate an operating time of a currently set washing course. Furthermore, the above three GUI buttons are configured to display a level indicating a strength setting of each step in the GUI button. That is, the GUI buttons are configured to allow the strength of each step to be set when the user touches the level indications of these three GUI buttons and drags the level indications in a direction different from a direction along the above time axis, i.e., in the vertical direction.

When the operating time of each step is set, specifically, the GUI buttons are configured to allow a time of each step to be set (set the time shorter or longer than a standard time, hereinafter referred to as shorten and extend) or the number of times of operations to decrease or increase by dragging a boundary between the GUI buttons of the respective steps.

The washing course selection button 207 is an input portion which selects an operation course of the washing machine. In the washing machine according to the present embodiment, the washing courses include the "automatic course (standard course)", the "express course" for washing clothes in a short time, the "scrubbing course" for washing clothes having many stains and the "night course" for washing clothes while suppressing sound at night. The washing courses are switched and used by the user as appropriate.

The fabric quality setting button 208 is an input portion which sets fabric quality to wash delicate clothes and special clothes. To wash delicate clothes such as wool or cashmere sweaters, blankets or comforters, adequate fabric quality is selected and set by the fabric quality setting button 208.

The operating time display part 209 is a display portion which displays an estimated value of an operating time of a currently set washing course. This estimated value changes depending on the amount of clothes to be washed and the degree of stains on clothes. Although the rinsing step is set based on the number of times, a total operating time is calculated by multiplying an estimated operating time of one rinsing step with the number of times of operations to be executed. That is, the operating time display part 209 indicates a total value of lengths (times) of the wash button 204, the rinse button 205 and the spin-dry button 206. During the washing operation, an operation indication shown on the operating time display part 209 decreases as the time passes and shows the remaining time required until washing is finished.

(Configuration Related to Function of Operation Display Part)

Next, a configuration related to the function of the operation display part 4 will be described with reference to FIG. 3.

The operation display part 4 is configured by a touch operating portion (a first operating portion, a second operating portion) 301, a touch sensing portion 302, the controller (an operating time determination part, a strength determination part) 303, a GUI display portion (a first display portion, a second display portion, a third display portion) 304, a SW operating portion 305, the memory (a first memory, a second memory, a third memory) 306, a fabric amount sensing portion 307 and a fabric quality setting portion 308. These portions cooperate with each other to cause the operation display part 4 to function.

As hardware, members such as a microcomputer, full dot liquid crystal, a capacitive touch panel, a capacitive touch sensor IC, a switch and a motor are provided, and the members are caused to function in cooperation with software which causes the microcomputer to operate.

The touch operating portion 301 is configured by the capacitive touch panel. When a touch of the user's finger changes the capacitance, the touch sensing portion 302 described later senses this change.

The touch sensing portion 302 is a sensor IC which detects the change in the capacitance of the touch operating portion 301. The touch sensing portion 302 outputs the detected capacitance change amount and coordinates of the detected position.

The controller 303 is configured by the microcomputer and the software, and obtains sensing information of various sensors and setting values of the operation display part 4. Note that, when the operating device is mounted on the washing machine as in the present embodiment, the washing machine includes a washing machine controller which can execute various types of control of the washing machine by driving a washing tub motor or a water supply pump, for example. Further, the controller 303 determines the operating time or the strength related to the function according to the size of the setting button of each step, and notifies this determined operating time or strength related to the function, to the washing machine controller. The washing machine controller performs various types of control of the washing machine according to this notified operating time or strength related to the function.

The GUI display portion 304 is full dot liquid crystal. The GUI display portion 304 creates a GUI drawn by the controller 303, in a video RAM, outputs a signal to the full dot liquid crystal per predetermined timing, and displays the GUI.

The SW operating portion 305 is configured by a tactile switch (SW). The SW operating portion 305 constitutes the key input portions which turns on the power, turns off the power, and starts an operation.

The memory 306 is a memory such as a ROM or a RAM. The memory 306 stores, for example, the number of times of rotations of the washing tub motor of each washing course, a rotation direction of the washing tub motor, a default setting value of an operating time or the number of times of operations of each step which makes up a washing course, and a settable range of the value. Further, the memory 306 stores a washing sequence executed according to each washing course. When the user changes the setting, the changes of the setting are stored in a RAM or a rewritable ROM (e.g. a Flash ROM or an EEPROM) as appropriate.

The fabric amount sensing portion 307 detects the amount of clothes put in the washing tub. The fabric amount sensing portion 307 can detect the clothes amount based on, for example, a load applied to a rotated pulsator. After clothes to be washed are loaded to the washing tub and the power is turned on, washing is started by the start key, the motor which drives the washing tub is rotated and then the fabric amount sensing portion 307 detects the clothes amount based on a load of the rotation. Subsequently, when a setting of the number of times of rotations of the washing tub or the like or a setting of an operating time of each step is changed, the controller 303 calculates the strength (e.g. the number of times of rotations of the washing tub) which the user can set in each step, the operating time set in each step and the number of times of operations in each step according to the fabric amount sensed by the fabric amount sensing portion 307. Further, when the user touches the touch operating portion 301, a GUI of a settable operating time or number of times of operations of each step set according to the fabric amount is displayed.

The fabric quality setting portion 308 corresponds to the fabric quality setting button 208. A setting menu is displayed in response to a user's touch operation, and is set to wash fabric quality such as delicate clothes (cashmere or wool), blankets or comforters. The set fabric quality is stored in the memory 306, and the strength (e.g. the number of times of rotations of the washing tub) which the user can set in each step, the operating time set in each step and the number of times of operations in each step are calculated according to the set fabric quality, and are displayed as GUIs when a touch operation is performed.

The operation display part 4 is configured by the touch operating portion 301, the touch sensing portion 302, the controller 303, the GUI display portion 304, the SW operating portion 305 and the memory 306 indicated by a dotted line portion in FIG. 3.

Embodiment 1

Next, an operation of setting an operating time of each step and changing the number of times of operations by a touch operation, and a function of this operation in the washing machine according to the present embodiment which includes an operation display part 4 having the above configuration will be described with reference to FIGS. 3 and 4 to 6.

Figure 4:
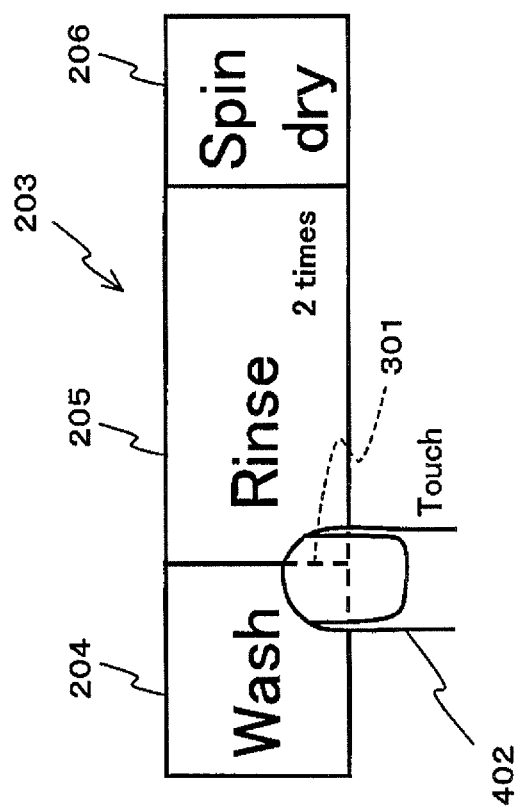
FIG. 4 is a view illustrating a display example of a step setting part when an operating time of a washing step of the washing machine according to Embodiment 1 of the present embodiment is changed.
Figure 5:
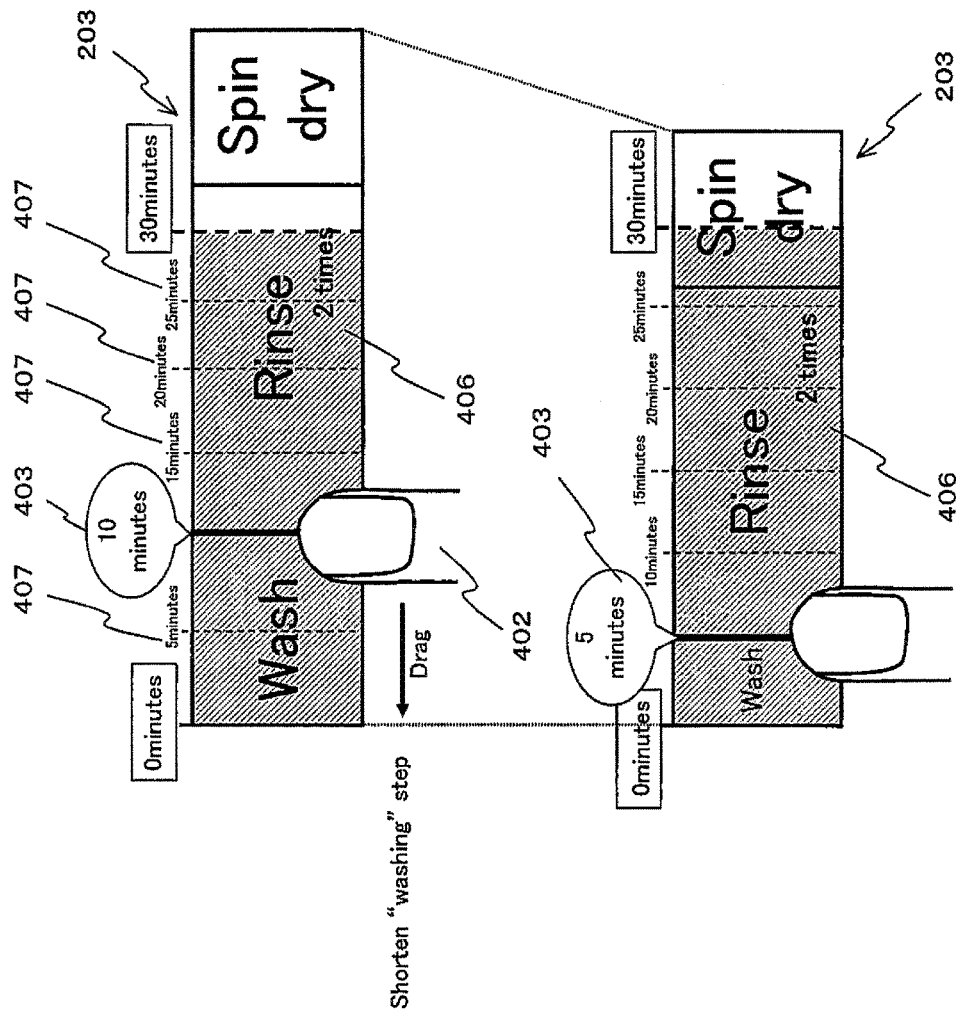
FIG. 5 is a view illustrating a display example of the step setting part when the operating time of the washing step of the washing machine according to Embodiment 1 of the present embodiment is changed.
Figure 6:
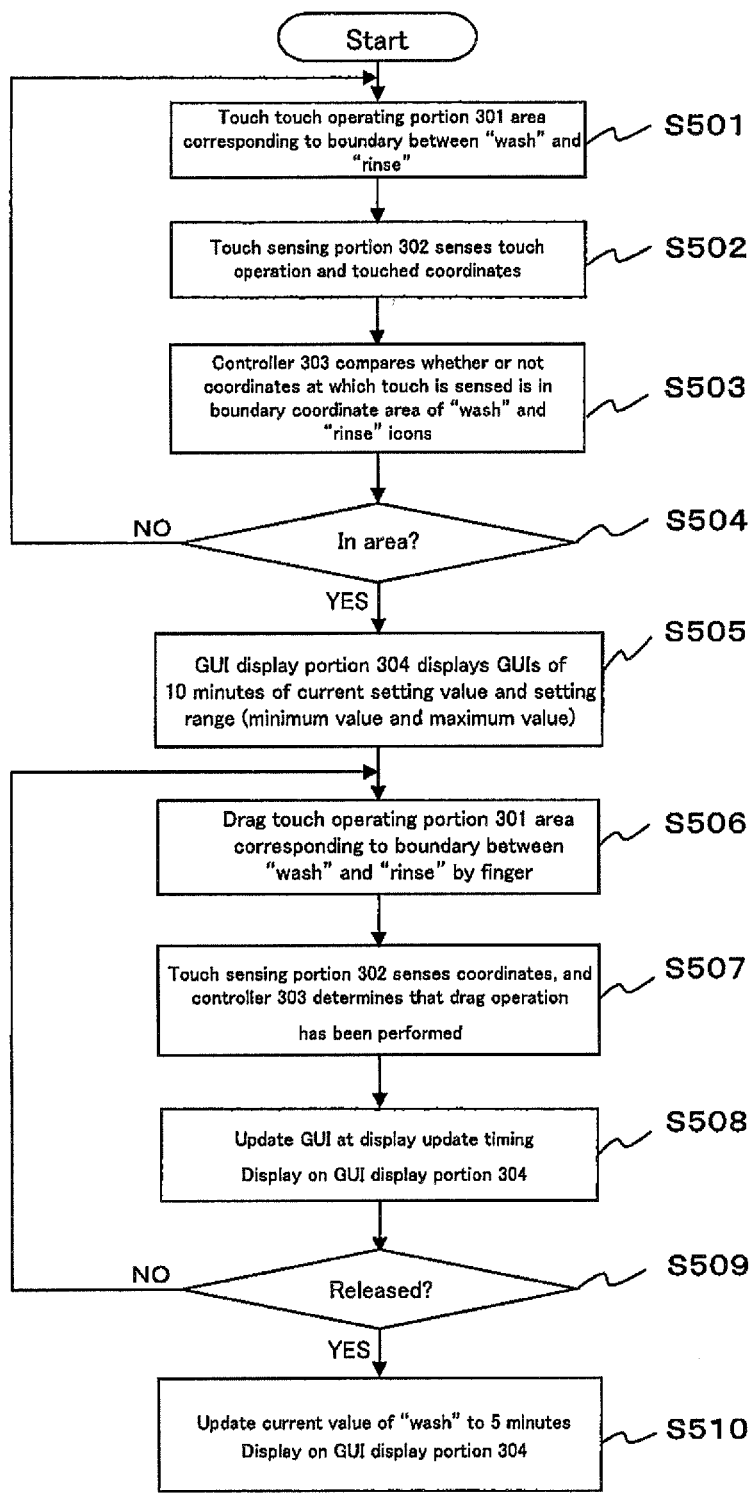
FIG. 6 is a flowchart illustrating an example of an operation of changing the operating time of the washing step by a touch operation in the washing machine illustrated in FIGS. 4 and 5.

FIGS. 4 and 5 are views illustrating display examples of a step setting part 203 when an operating time of a washing step of the washing machine according to Embodiment 1 of the present embodiment is changed. FIG. 6 is a flowchart illustrating an example of an operation of changing the operating time of the washing step by a touch operation in the washing machine illustrated in FIGS. 4 and 5.

On the step setting part 203 displayed on the operation display part 4, buttons (a wash button 204, a rinse button 205 and a spin-dry button 206) indicating each step corresponding to a washing course are displayed in a time sequence in the horizontal direction in FIGS. 4 and 5. In the examples illustrated in FIGS. 4 and 5, a direction in which the time passes is a direction from the left to the right in FIGS. 4 and 5. Hence, in the case of the washing courses illustrated in FIGS. 4 and 5, the washing step is first executed, the rinsing step is then executed (2 times) and the spin-drying step is executed in this order. Here, when the operating time of the washing step is changed, a user touches by a finger 402 a touch operating portion 301 area (see FIG. 4) corresponding to the vicinity of a boundary between the wash button 204 and the rinse button 205 of the step setting part 203 displayed on the operation display part 4 of the washing machine according to Embodiment 1 as illustrated in FIG. 4 (S501).

When the user touches by the finger the touch operating portion 301 area corresponding to the vicinity of the boundary, a touch sensing portion 302 simultaneously senses a user's touch operation and senses touched coordinates, and outputs the coordinates to a controller 303 (S502).

When receiving the coordinates (touched coordinates) sensed by the touch sensing portion 302, the controller 303 compares the received touched coordinates with boundary coordinates of the wash button 204 and the rinse button 205 stored in a memory 306, and determines whether or not the touch operating portion 301 area in a predetermined area including the boundary coordinates is touched (S503 and S504).

When determining that the touched coordinates are in the predetermined area including the above boundary coordinates ("YES" in step S504), the controller 303 reads a current setting value 403 (10 minutes in the example in FIG. 4) and a settable range 406 (including a minimum value and a maximum value) from a memory 306. Further, a GUI display portion 304 causes a GUI operation display part 201 to display GUIs of the read current setting value 403 and the settable range 406 (S505). Specifically, GUI indications are obtained by superimposing the settable range 406 of the washing step of a currently selected washing course and the current setting value 403 on indications on the step setting part 203 as indicated by diagonal line portions in FIG. 5. In the case of Embodiment 1 illustrated in FIG. 5, the operating time of the washing step can be set in a range of a minimum value of 0 minutes to a maximum value of 30 minutes. Therefore, a color of the settable range 406 including the current setting value 403 (10 minutes) is changed from a color of the other ranges and displayed. Further, hatching is applied to this settable range 406 to provide a visual effect of distinguishing the settable range 406 from the other ranges. Furthermore, the GUIs are displayed by allocating scales 407 in predetermined units to allow a time amount which is changed in the settable range 406 to be intuitively understood.

For example, the finger 402 touching the boundary between wash and rinse displayed on the step setting part 203 illustrated at an upper stage of FIG. 5 is moved to the left side of FIG. 5, as displayed on the step setting part 203 illustrated at a lower stage of FIG. 5. That is, when the finger 402 put at the boundary is dragged to a position of 5 minutes of the scale 407 as a motion of the finger as illustrated at the lower stage of FIG. 5 (S506), the touch sensing portion 302 senses the coordinates of the touch operating portion 301 area touched by the finger at predetermined time intervals (about several 10 milliseconds). Further, the touch sensing portion 302 sends the touched coordinates of the sensed touch operating portion 301 area to the controller 303. When receiving the touched coordinates from the touch sensing portion 302, the controller 303 determines that the drag operation has been executed on the step setting part 203 of the operation display part 4 (S507). Further, when obtaining the touched coordinates, the controller 303 creates screen data for displaying an operation GUI screen (first display image) according to the obtained touched coordinates, and causes the memory 306 to store the screen data. The GUI display portion 304 displays the screen data of the operation GUI screen stored in the memory 306, on the operation display part 4 per image update timing (S508). In terms of display, for example, as illustrated at the lower stage of FIG. 5, a time indication indicated by the current setting value 403 becomes 5 minutes, the boundary moves and the length of the wash button 204 displayed as a bar becomes short.

When the finger 402 touching the operation display part 4 is released (release is an operation of moving the finger away from an operation target touched by the finger 402) ("YES" in step S509), the touch sensing portion 302 senses that the finger 402 has been released, and sends to the controller 303 release information indicating that the finger 402 has been released and the coordinates of the touch operating portion 301 area indicating a position at which the finger 402 has been released. Further, the controller 303 obtains these pieces of information. The controller 303 creates screen data for displaying a GUI screen in which a setting value of "wash" is updated to 5 minutes, and displays the GUI screen on the GUI display portion 304 based on the screen data (S510).

More specifically, a change (10 minutes to 5 minutes) of the setting of the operating time of the washing step is determined, the indications of the settable range 406 and the current setting value 403 displayed as GUIs disappear, and changing the operating time of the washing step is finished. A bar indication indicating the entire step setting part 203 simultaneously becomes short. Consequently, it is possible to visually and intuitively recognize that a washing operating time is shortened compared to a previously set washing operating time.

Figure 7:
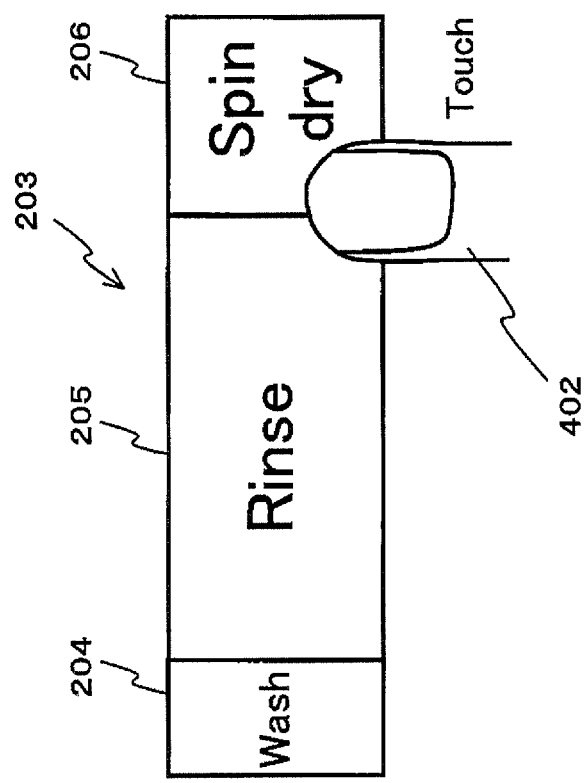
FIG. 7 is a view illustrating a display example of the step setting part when the number of times of rinsing (time) is changed in the washing machine according to Embodiment 1 of the present embodiment.
Figure 8:
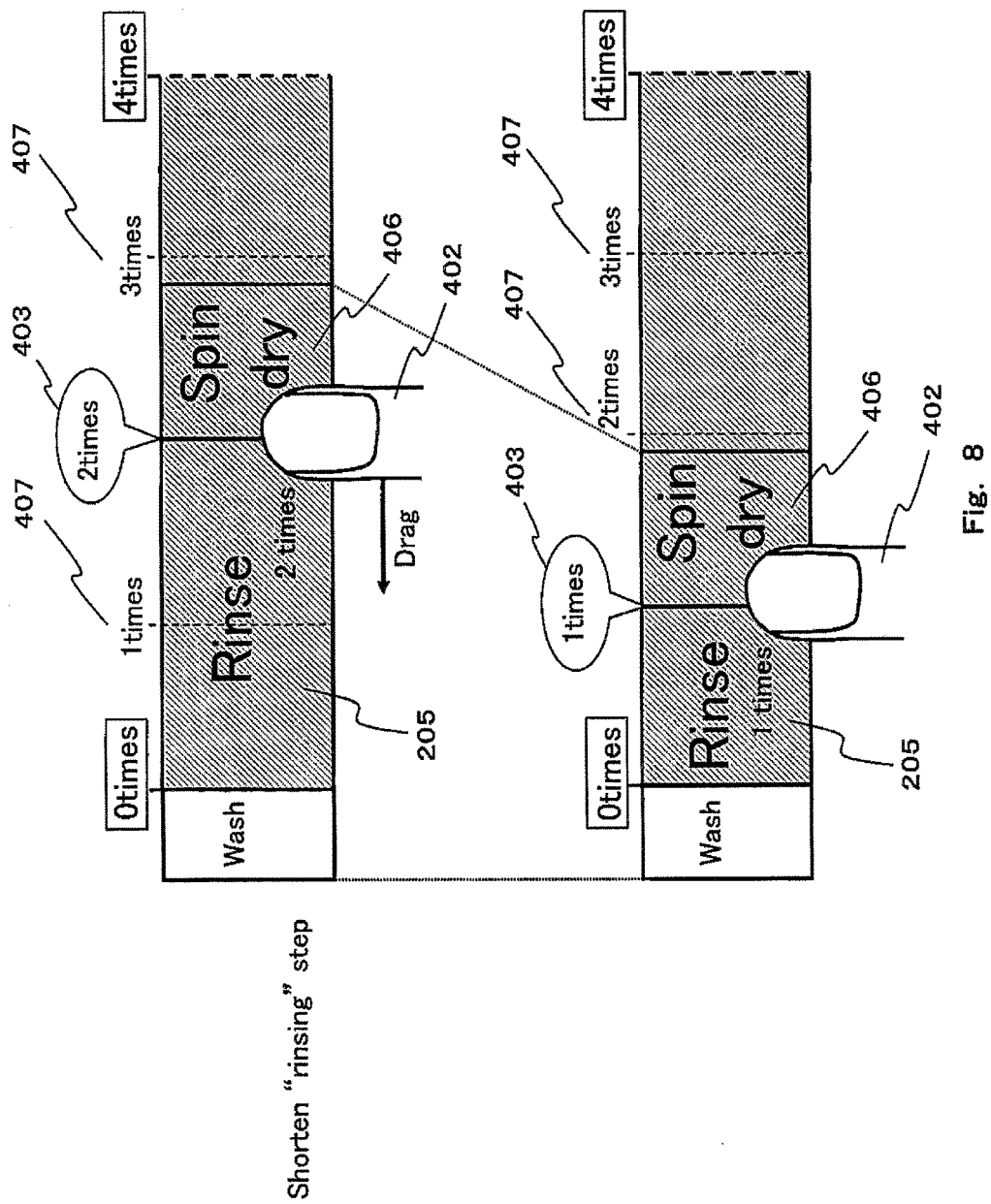
FIG. 8 is a view illustrating a display example of the step setting part when the number of times of rinsing (time) is changed in the washing machine according to Embodiment 1 of the present embodiment.
Figure 9:
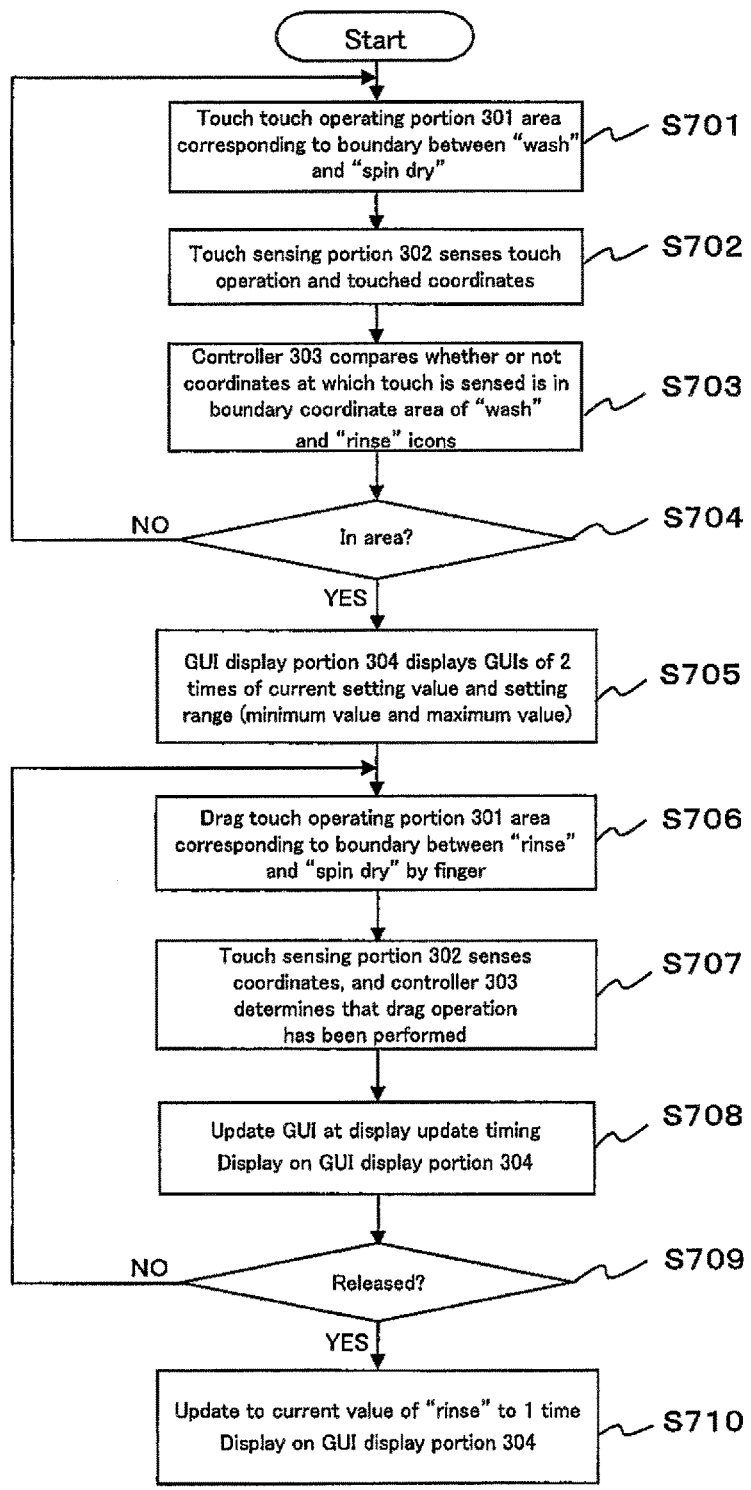
FIG. 9 is a flowchart illustrating an example of an operation of changing the number of times of rinsing (time) by performing a touch operation on the step setting part illustrated in FIGS. 7 and 8.

Next, an operation of changing an operating time of the rinsing step and a function of this operation will be described with reference to FIGS. 7 to 9. FIGS. 7 and 8 are views illustrating display examples of the step setting part 203 when the number of times of rinsing (time) is changed in the washing machine according to Embodiment 1 of the present embodiment. FIG. 9 is a flowchart illustrating an example of an operation of changing the number of times of rinsing (time) by performing a touch operation on the step setting part 203 illustrated in FIGS. 7 and 8.

Similarly to a case where the operating time of the washing step is changed, when the operating time of the rinsing step is changed, the user touches by the finger 402 the touch operating portion 301 area corresponding to the vicinity of the boundary between the rinse button 205 and the spin-dry button 206 of the step setting part 203 as illustrated in FIG. 7 (S701).

When the user touches by the finger the touch operating portion 301 area as described above, similarly to the washing step, the touch sensing portion 302 simultaneously senses a user's touch operation and senses touched coordinates which are touched, and outputs the coordinates to the controller 303 (S702).

When receiving the touched coordinates sensed by the touch sensing portion 302, the controller 303 compares the received touched coordinates with coordinates of a boundary between a "rinse" icon (rinse button 205) and a "spin-dry" icon (the spin-dry button 206) stored in the memory 306, and determines whether or not the touch operating portion 301 area in a predetermined area (boundary coordinate area) including the boundary coordinates has been touched (S703 and S704).

When the controller 303 determines that the touched coordinates are in the predetermined area including the above boundary coordinates ("YES" in step S704), the GUI display portion 304 causes the GUI operation display part 201 to display GUIs of the current setting value 403 (the number of times of rinsing is 2 times in the example in FIG. 8) and the settable range 406 (including a minimum value and a maximum value) (S705). Specifically, GUI indications are obtained by superimposing the settable range 406 of the rinsing step of a currently selected washing course and the current setting value 403 on indications on the step setting part 203 as indicated by diagonal line portions in FIG. 8. In the case of Embodiment 1 illustrated in FIG. 8, the number of times of executions of the rinsing step can be set in a range of a minimum value of 0 times to a maximum value of 4 times. Therefore, a color of the settable range 406 including the current setting value 403 (2 times) is changed from colors of the other ranges and displayed. Further, hatching is applied to this settable range 406 to provide a visual effect of distinguishing the settable range 406 from the other ranges. Furthermore, the GUIs are displayed by allocating the scales 407 in predetermined units to allow the number of times which is changed in the settable range 406 to be intuitively understood.

As described above, in the case of the rinsing step, the number of times is set instead of the time. An estimated operating time calculated based on the number of times and the amount of clothes is displayed as the operating time of the rinsing step. The estimated operating time is variable during the operation depending on a washing operation status. Further, as a rinsing method, water-saving rinsing (normal rinsing) and water-pouring rinsing can also be selected by the setting.

For example, the finger 402 touching the boundary between rinse and spin dry displayed on the step setting part 203 illustrated at an upper stage of FIG. 8 is moved to the left in the figure as displayed on the step setting part 203 illustrated at a lower stage of FIG. 8. That is, when the finger 402 put at the boundary is dragged to a position of 1 time of the scale 407 as a motion of the finger as illustrated at the lower stage of FIG. 8 (S706), the touch sensing portion 302 senses the coordinates of the touch operating portion 301 area touched by the finger at predetermined time intervals as described above. Further, the touch sensing portion 302 sends the touched coordinates of the sensed touch operating portion 301 area to the controller 303. When receiving the touched coordinates from the touch sensing portion 302, the controller 303 determines that the drag operation has been executed on the step setting part 203 of the operation display part 4 (S707). Further, when obtaining the touched coordinates, the controller 303 creates screen data for displaying an operation GUI screen according to the obtained touched coordinates, and causes the memory 306 to store the screen data. The GUI display portion 304 displays the screen data of the operation GUI screen stored in the memory 306, on the GUI operation display part 201 per image update timing (S708). In terms of display, for example, as illustrated at the lower stage of FIG. 8, an indication of the number of times indicated by the current setting value 403 becomes 1 time, the boundary moves and the length of the rinse button 205 displayed as a bar becomes short.

When the finger 402 touching the operation display part 4 is released ("YES" in step S709), the touch sensing portion 302 senses that the finger 402 has been released, and sends to the controller 303 release information indicating that the finger 402 has been released and the coordinates of the touch operating portion 301 area indicating a position at which the finger 402 has been released. Further, when obtaining these pieces of information, the controller 303 creates screen data for displaying a GUI screen in which a setting value of the number of times of "rinse" is updated to 1 time. Furthermore, the GUI display portion 304 displays the GUI screen based on the screen data (S710).

More specifically, when a change (2 times to 1 time) of the setting value of the number of times of rinsing (time) is determined, the GUI display portion 304 make the indications of the setting range 406 and the current setting value 403 displayed as the GUIs disappear. Thus, changing the number of times of rinsing (time) is finished. As described above, the time (the number of times) of the rinsing step is also reduced in addition to the washing step. In this case, a bar indication indicating the entire step setting part 203 becomes short. Consequently, it is possible to visually and intuitively recognize that a washing operating time is shortened compared to a previously set washing operating time.

Although not illustrated, upon setting the washing step and setting the rinsing step, a display color indicating a setting range of a strength setting level is changed to make it easy for the user to intuitively recognize a strength setting of which step is changed when the user changes the strength setting. Further, instead of changing a display color, a display pattern (hatching) or a position indicating each setting range may be changed and displayed. Note that, changing and displaying a position indicating a setting range means, for example, displaying one of setting ranges of the washing setting and the rinsing setting at an upper side of the step setting part 203 and the other at the lower side, or displaying the setting ranges to be distinguished by superimposing the setting ranges.

It is possible to perform an operation of not only reducing the operating time and the number of times of operations of each step but also increasing the operating time and the number of times operations of each step likewise. Further, it is also possible to shorten or extend an operating time of the spin-drying step by performing the same operation as that in the washing step or the rinsing step.

Furthermore, changing the time and changing the number of times by performing an operation of touching a boundary between the steps have been described. However, a configuration of shortening (reducing) or extending (increasing) the operating time (the number of times) of each step by dragging part of an icon of each step in a specific direction may also be employed.

Further, GUI display modes of a current setting value and a setting range of each step only need to be modes which can be expressed by the step setting part 203 as appropriate, and are not limited to the GUI display modes according to the present embodiment.

In addition, a GUI of a setting range displayed upon the touch operation is displayed as a range calculated from at least one of sensing information of the fabric amount sensing portion 307 and a setting value of the fabric quality setting portion 308, and a range calculated from the washing course, to wait for a user's operation. For example, when the clothes amount sensed by the fabric amount sensing portion 307 is small, a state is displayed where a maximum time and the number of times of setting ranges of each step are set to values smaller than normal values.

Further, when the fabric quality setting portion 308 sets clothes which need to be delicately handled, a much shorter maximum time of a spin-drying time is displayed and an operation is performed. Consequently, it is possible to prevent a washing operation from being carried out more than necessary and optimally control the operation while saving energy.

Figure 10:
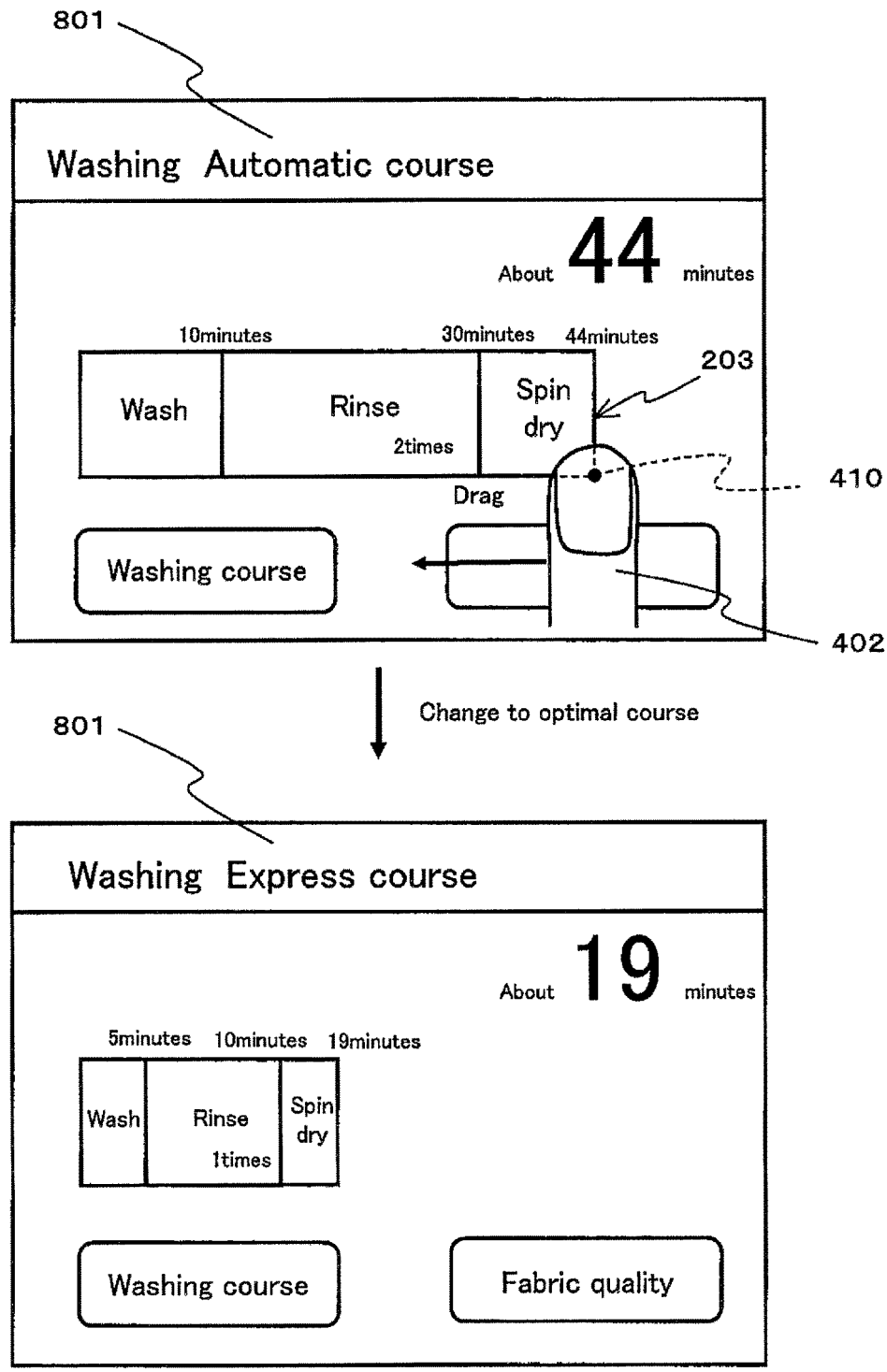
FIG. 10 is a view illustrating a display example of the operation display part when a time of an entire washing course is shortened by performing a touch operation on the step setting part illustrated in FIGS. 7 and 8.

Further, to change the operating time of the entire washing operation at a time, the user touches by the finger 402 a corner 410 at a lower right end of the step setting part 203 as illustrated at an upper stage of FIG. 10 to drag to the left in the figure. Thus, it is possible to set time reduction of the entire washing course. FIG. 10 is a view illustrating a display example of the operation display part 4 when a time of an entire washing course is shortened by performing a touch operation on the step setting part illustrated in FIGS. 7 and 8. When the operating time of only the spin-drying step needs to be extended or shortened, the user performs an operation of touching the vicinity of the right side of the spin-dry button 206. Positions at which a touch operation can be performed vary between the case where an operating time of an entire washing operation is changed at a time and the case where an operating time of only the spin-drying step is changed.

Figure 11:
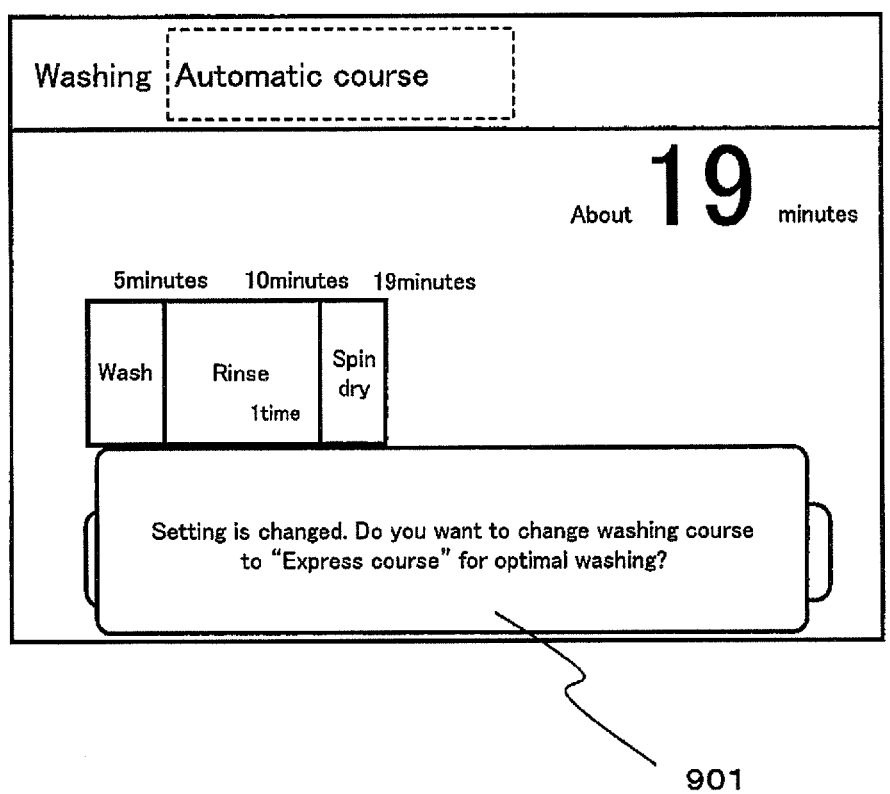
FIG. 11 is a view illustrating an example of a pop-up display displayed on the operation display part according to Embodiment 1 of the present embodiment.

In this case, a time of the washing operation whose the operating time of the automatic course is set to 44 minutes at the upper stage of FIG. 10 is changed by the above touch operation, and then the operating time is shortened to about 19 minutes of a washing operation as illustrated at the lower stage of FIG. 10. In this case, the controller 303 changes various setting values such that the washing course becomes an optimal course corresponding to the shortened operating time. Further, when the washing course is changed, the GUI operation display part 201 notifies a message of a pop-up display 901 illustrated in FIG. 11 saying: "A setting is changed. Do you want to change to the "express course" for optimal washing?" Subsequently, in response to pushing of a displayed confirm button, the controller 303 determines the change of the washing course. Further, the controller 303 notifies various setting values corresponding to the changed selected course, to the washing machine controller. The washing machine controller optimally controls the washing machine based on the various setting values notified from the controller 303. In this case, an indication of a washing course 801 on the GUI operation display part 201 is also changed from the "automatic course" to the "express course". FIG. 11 is a view illustrating an example of the pop-up display 901 displayed on the operation display part according to Embodiment 1 of the present embodiment.

A case where a time of the entire washing course is changed has been described in the present embodiment. However, a configuration can be employed in which, not only when the time of the entire washing course is changed but also when washing, rinsing and spin-drying of each step are individually changed, it is possible to change a washing course name to a washing course optimal for the changed time setting. Further, the GUI indication is changed to an indication corresponding to the changed washing course name.

Furthermore, the washing machine according to the present embodiment can cause the memory 306 to store a change amount of the number of times of rinsing before a setting change to the number of times of rinsing after the setting change such that the setting of the number of times of rinsing step is changed in conjunction with the change of the setting of the operating time of the washing step. More specifically, when the washing step is shortened 5 minutes or more, −1 time is stored as the number of times of rinsing in the memory 306. Thus, when the operating time of the washing step is shortened 5 minutes, the setting value of the number of times of rinsing is changed to −1 time in conjunction with the setting change of the operating time of this washing step. Thus, only by changing a time setting of a specific step, it is possible to change a setting such that an operation can also be performed with a more optimal time setting in other steps. Further, it is possible to change a setting of the other step in conjunction with a setting change of one step. Consequently, it is possible to reduce the number of times of operations related to the change of the setting and improve convenience.

Further, optimal values of an operating time of the washing step, the number of times of operations of the rinsing step and an operating time of the spin-drying step in the entire time are stored in advance in the memory 306. Hence, when the time of the entire washing course is shortened as described above, setting values of each step are changed to optimal setting values based on the optimal values stored in the memory 306. Thus, the washing machine according to the present embodiment can change the setting of each step by changing the entire time. Consequently, it is possible to reduce the number of times of operations related to the setting change and improve convenience.

Further, a configuration of changing a setting of an operating time (the number of times of operations) of the rinsing step in response to a setting change of an operating time of the washing step has been described as an example. However, similarly to the above washing step, the controller 303 can control a setting change of a time of the rinsing step or the spin-drying step such that setting values of the other steps are changed in conjunction with the setting change. Further, a case where set operating times are shortened has been described above as an example. However, the same also applies to a case where the operating time is set to be extended. Further, it is preferable to appropriately switch between cases where setting values of the other steps are changed in conjunction with a change of a setting value of one step and are not changed.

Thus, according to the present embodiment, it is possible to change a setting of a time duration of an arbitrary step by a user's operation of touching the touch operating portion 301 in a home appliance such as a washing machine including at least a plurality of steps. That is, when a setting is changed in this way, if the user touches the touch operating portion 301 area in the vicinity of a boundary between the first step and the second step, the controller 303 reads an extendable setting range stored in the memory 306 according to this position. Further, the GUI display portion 304 displays this read setting range. Consequently, it is possible to visually indicate an extending/shortening range corresponding to a step whose setting of a time duration is changed, so that user's convenience and operability improve. Further, the GUI display portion 304 can display an extending/shortening range corresponding to each step, so that it is possible to change a time in an optimal range corresponding to steps and a state of a home appliance.

Furthermore, the operation display part according to the present embodiment and the GUI display portion 304 which displays a setting range of the time are configured to display GUIs by providing and displaying scales and numerical values of levels per predetermined unit. Consequently, the user can easily understand currently set values such as a value of a changed time setting. Consequently, it is possible to easily perform an operation of increasing or decreasing a value compared to a currently set value when necessary. As a result, it is possible to improve operability and convenience.

Further, according to a configuration of displaying scales or levels for setting a time duration to extend or shorten according to each step of a home appliance (electric machine and appliance) such as a washing machine, it is possible to change a unit width of a time (units of 1 minute, units of 10 minutes, or the like) or a unit (minutes or the number of times). Consequently, it is possible to display an extendable setting range with an optimal unit width in each step, so that convenience and operability improve.

Further, the operation display part 4 according to the present embodiment is configured to perform an operation and change a setting while visually displaying an operating time of each step which changes in response to a setting change of a time duration caused by a user's touch on the touch operating portion 301, or an estimated time of an operating time of an entire step which reflects a change in the operating time of each step. Consequently, it is possible to improve user's operability and convenience.

Further, the operation display part 4 according to the present embodiment may be configured such that the GUI display portion 304 varies a display mode (a color or a pattern) of a step whose setting is changed and displays the display mode. According to this configuration, the user can intuitively recognize in which step the setting is changed, and improve operability and convenience while preventing an erroneous operation.

Further, the operation display part 4 according to the present embodiment is configured such that the memory 306 stores a change amount of the second step associated with a setting change of the first step. Furthermore, the operation display part 4 is configured to be able to change a setting value of the second step in conjunction with a change of the setting of the operating time of the first step. Thus, it is possible to change the setting value of the second step in conjunction with the setting change of the first step. Consequently, it is possible to change the setting value of each step to an adequate value and more optimally control the washing machine according to the present embodiment. Further, it is possible to change even a setting value of the second value in conjunction with the setting change of the first step. Consequently, it is possible to improve user's operability and convenience. Further, in contrast, the memory 306 can store the change amount of the first step in association with the setting change of the second step. Consequently, similarly, it is possible to more optimally control the washing machine according to the present embodiment, and improve user's operability and convenience.

Further, the operation display part 4 according to the present embodiment is configured such that the GUI display portion 304 visually displays GUIs of a time duration of each step and an entire required time of the washing course when the user selects a washing course. Furthermore, when the user touches a GUI display area (touch operating portion 301 area) of each step, a setting range and a current setting value stored per step of each washing course in the memory 306 are displayed on the left and the right of a boundary indication between the touched step and a next step. Consequently, the user can easily change a time of a desired step while intuitively recognizing the entire time required for washing. Further, it is possible to simultaneously display a setting range optimal for the step per washing course, and consequently perform control to set a setting value in this optimal setting range. Furthermore, it is also possible to perform control to efficiently set a setting value of each step of the washing course.

Still further, the washing machine according to the present embodiment includes the fabric amount sensing portion 307. In this case, the controller 303 provided in the operation display part 4 can calculate a value of an optimal execution time of each step and a setting range which can be set by the user, based on the washing course and the fabric amount sensing information sensed by the fabric amount sensing portion 307. Further, the GUI display portion 304 can display GUIs of the optimal execution time and the settable range calculated by the controller 303.

Consequently, the operation display part 4 according to the present embodiment can adequately display an execution time or a settable range of each step, and improve convenience of these settings.

Further, since the fabric amount sensing portion 307 is provided as described above, the controller 303 calculates an optimal setting range based on fabric amount information of laundry sensed by this fabric amount sensing portion 307 and the GUI display portion 304 causes the GUI operation display part 201 to display this calculated setting range. Consequently, in the washing machine according to the present embodiment, a washing machine controller can perform various types of control of the washing machine according to an execution time inputted by a user's operation with reference to the optimal execution time and the settable range calculated by the controller 303. Consequently, the washing machine can perform control to execute a washing course according to a fabric amount, prevent a washing course from being unnecessarily executed and controlled, and improve power saving performance.

Further, the washing machine according to the present embodiment includes the fabric quality setting portion 308. In this case, the controller 303 provided in the operation display part 4 can calculate a value of an optimal execution time of each step and a setting range which can be set by the user, based on fabric quality information and a washing course set by the user by pushing the fabric quality setting button 208 and the washing course selection button. Further, the GUI display portion 304 can display GUIs of the optimal execution time and the settable range calculated by the controller 303. Consequently, the operation display part 4 according to the present embodiment can adequately display an execution time or a settable range of each step, and improve convenience of these settings.

Further, since the fabric quality setting portion 308 is provided as described above, the controller 303 can calculate an optimal setting range based on fabric quality information of laundry set by this fabric quality setting portion 308 and the GUI display portion 304 can cause the GUI operation display part 201 to display this calculated setting range. Consequently, the operation display part 4 of the washing machine according to the present embodiment can display a setting range according to fabric quality, so that it is possible to improve functionality and convenience of the washing machine.

Further, when changing a step time of one of steps such as the washing, rinsing and spin-drying, the operation display part 4 of the washing machine according to the present embodiment can change a washing course based on which the washing machine is controlled, to an optimal washing course according to a value of the changed setting time. Consequently, the washing machine is more optimally controlled, so that functionality and convenience of the washing machine improve.

Further, in the washing machine according to the present embodiment, when a washing course is changed, the GUI display portion 304 of the GUI operation display part 201 notifies that the washing course based on which the washing machine is controlled is changed. Consequently, the user can recognize the change of the washing course, and convenience improves.

Note that a configuration of changing a washing course according to an operation of shortening a setting time as described above has been described in the present embodiment. However, a washing course can be changed likewise by a time extending operation.

Embodiment 2

Next, there will be described a configuration of setting a strength of each step in combination with a configuration of setting an operating time mentioned in Embodiment 1 in a washing machine having the above configuration. That is, an operation of changing a strength setting of each step by a user's touch operation and a function of this operation will be mainly described in Embodiment 2. The washing machine according to Embodiment 2 of the present embodiment will be described with reference to FIGS. 12 to 15, in addition to FIGS. 1 to 3 described above.

Figure 12:
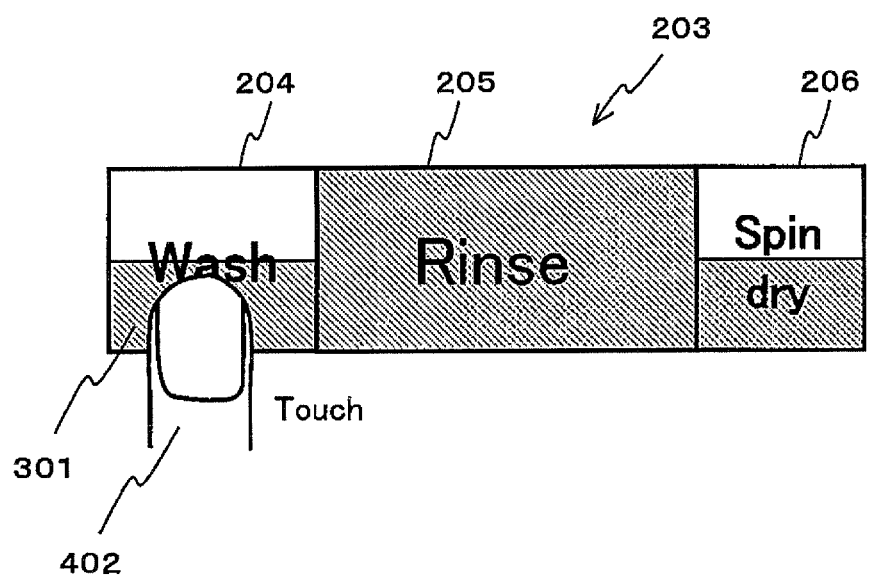
FIG. 12 is a view illustrating a display example of the step setting part when a strength setting of the washing step is changed in the washing machine according to Embodiment 2 of the present embodiment.
Figure 13:
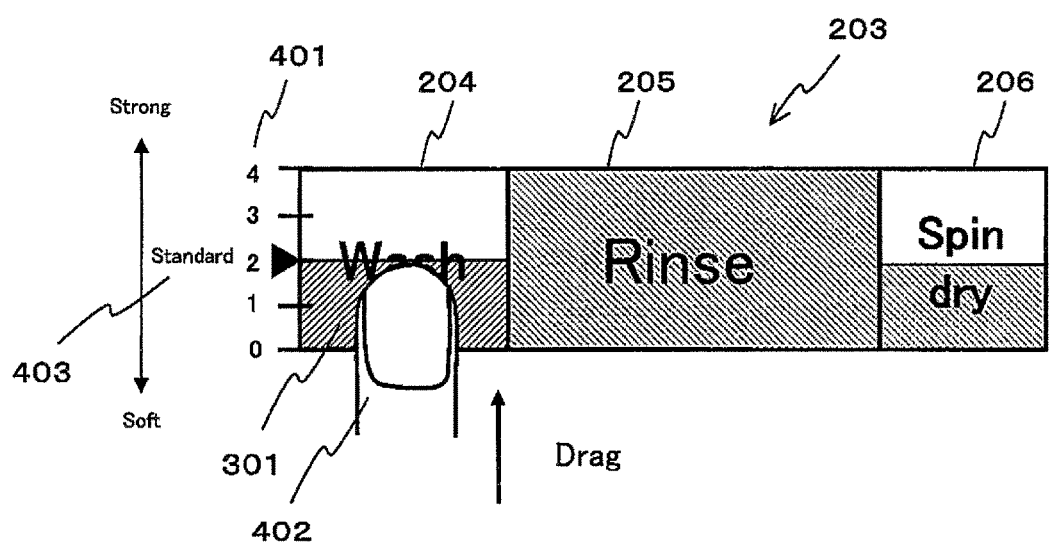
FIG. 13 is a view illustrating a display example of the step setting part when a strength setting of the washing step is changed in the washing machine according to Embodiment 2 of the present embodiment.
Figure 14:
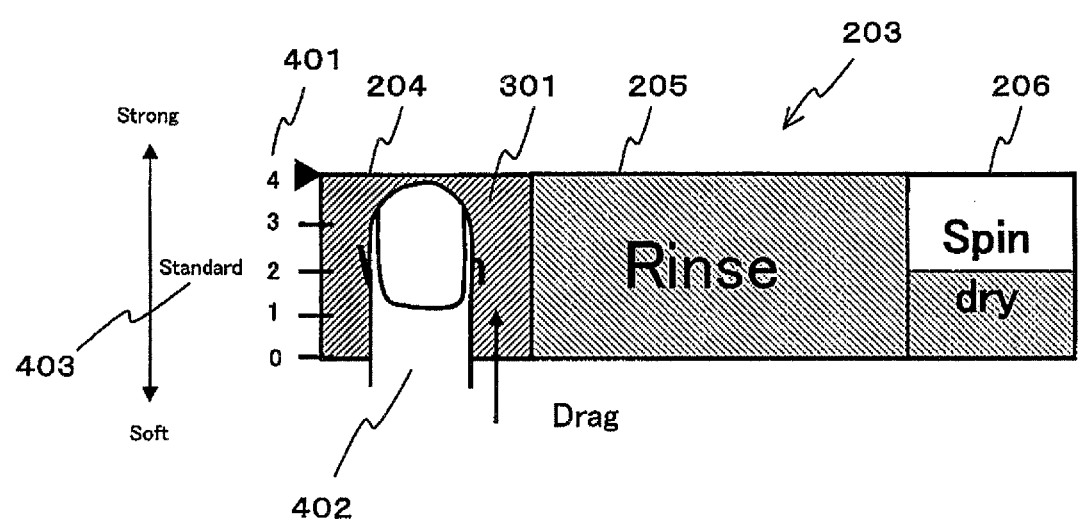
FIG. 14 is a view illustrating a display example of the step setting part when a strength setting of the washing step is changed in the washing machine according to Embodiment 2 of the present embodiment.
Figure 15:
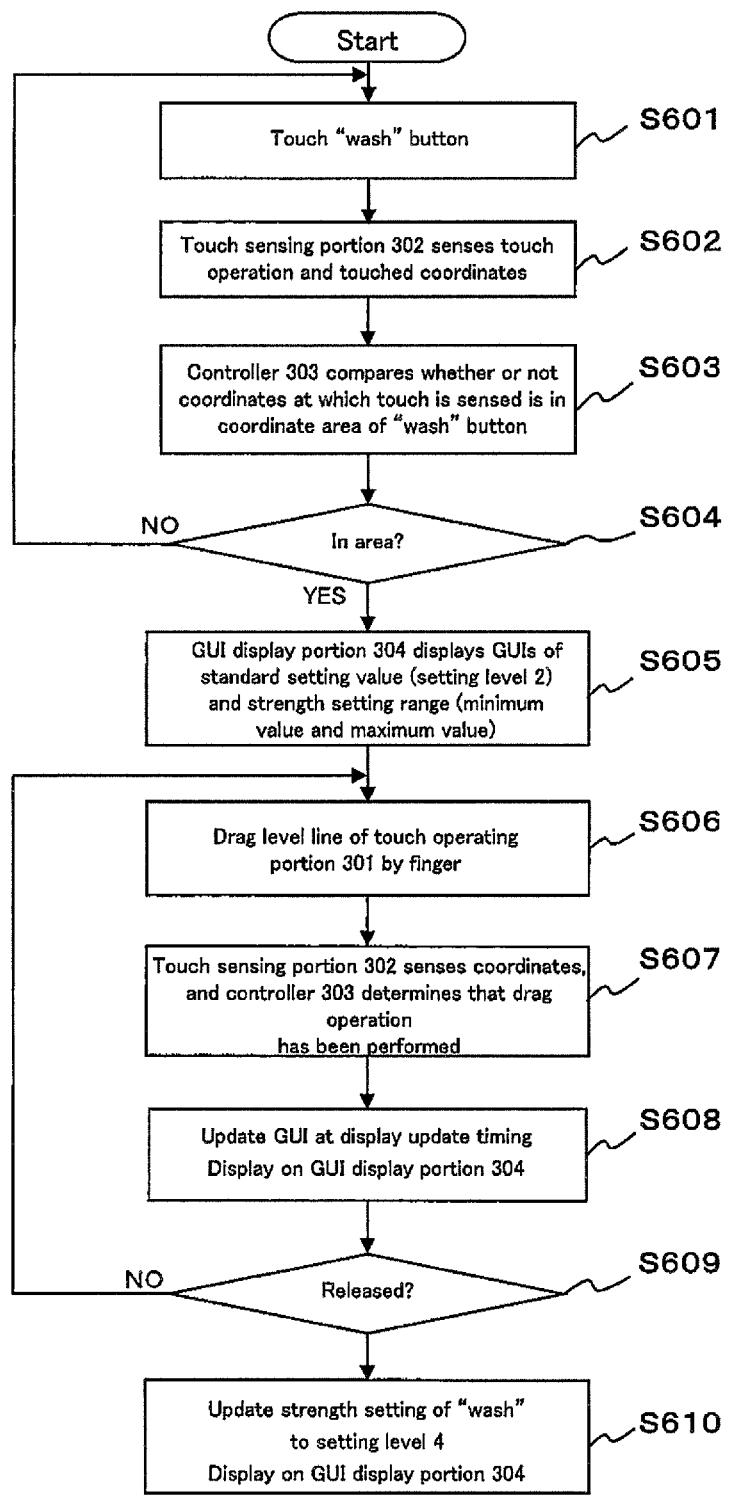
FIG. 15 is a flowchart illustrating an example of an operation of changing the strength setting of the washing step by performing the touch operation on the step setting part illustrated in FIGS. 12 to 14.

FIGS. 12 to 14 are views illustrating display examples of a step setting part 203 when a strength setting of a washing step is changed in the washing machine according to Embodiment 2 of the present embodiment. FIG. 15 is a flowchart illustrating an example of the operation of changing the strength setting of the washing step by performing the touch operation on the step setting part illustrated in FIGS. 12 to 14.

As illustrated in FIGS. 12 to 14, on the step setting part 203 displayed on an operation display part 4, buttons (a wash button 204, a rinse button 205 and a spin-dry button 206) indicating respective steps corresponding to washing courses are displayed. In the examples illustrated in FIGS. 12 to 14, a direction in which the time passes is a direction from the left to the right in the figure. Hence, in the case of the washing courses illustrated in FIGS. 12 to 14, the washing step is first executed, the rinsing step is then executed, and the spin-drying step is executed in this order. In this case, when changing the strength setting of each step, a user touches, for example, the wash button 204 of the step setting part 203 of the washing machine according to Embodiment 2 by a finger 402 as illustrated in FIGS. 12 to 14 (S601).

When power of the washing machine according to Embodiment 2 of the present embodiment is turned on, a GUI operation display part 201 displays a display image (second display image) indicating a strength setting level of each step of a currently selected washing course. Note that the degree of the strength of each step is correlated with a size of a display image indicating a strength setting level. Further, this strength setting level is configured to be displayed as a standard setting value (default value) before the setting is changed (see, for example, FIG. 12). By displaying display images indicating strength setting levels on the GUI operation display part 201, the user can intuitively recognize at which degree of strength the clothes are washed in the washing step. In FIG. 12, the washing course is set to an automatic course, and the strength setting level of each step is set to a setting value set as a standard.

A timing at which the GUI operation display part 201 displays display images indicating strength setting levels is, for example, when the user touches a touch operating portion 301 by the finger 402 (in other words, when the user wants to change a setting). That is, the washing machine is configured to display display images indicating strength setting levels when necessary.

Further, a display image indicating a strength setting level may be displayed as a numerical value on or around each button (the wash button 204, the rinse button 205 and the spin-dry button 206) indicating each step displayed on the GUI operation display part 201.

First, when the user touches by the finger the touch operating portion 301 area corresponding to a display region of the GUI operation display part 201 which displays the wash button 204, a touch sensing portion 302 simultaneously senses a user's touch operation and senses touched coordinates, and outputs the coordinates to a controller 303 (S602).

Further, when receiving the coordinates (touched coordinates) sensed by the touch sensing portion 302, the controller 303 reads information of a coordinate area of the display region of the wash button 204 from a memory 306. Furthermore, the controller 303 compares this information of the coordinate area with the obtained touched coordinates, and determines whether or not the coordinate area of the display region of the wash button 204 is touched (S603 and S604).

When determining that the touched coordinates are in the above coordinate area of the display region of the wash button 204 described above ("YES" in step S604), the controller 303 obtains from the memory 306 a current setting value 403 (standard setting value) of a strength setting level of the washing step which is set according to the automatic course, and information related to a settable range of this strength setting level. Further, a GUI display portion 304 causes the GUI operation display part 201 to display GUIs of the obtained current setting value 403 (level 2) and a settable range (including a minimum value and a maximum value) (S605). More specifically, the GUI display portion 304 displays "standard" at a position indicating the current setting value 403. By displaying to the user a setting position of a default standard setting value (current setting value 403) in a frame of the washing step indicating the strength setting level, the user can easily perform an operation of changing the strength setting level. In terms of display, as illustrated in FIG. 13, a GUI of a strength setting scale 401 indicating a strength setting level of the washing step of the current washing course is displayed in the vertical direction and on the left of the display position of the wash button 204. In the example in FIG. 13, the GUI of the strength setting scale 401 is displayed such that a value of the strength setting level becomes higher toward the upper direction in the figure. Further, as illustrated in FIG. 13, the GUI display portion 304 displays "strong" which is a term expressing a mode of the washing method in association with the upper direction of the strength setting scale 401, and displays "soft" which is a term expressing a mode of the washing method in association with the lower direction. Consequently, the GUI operation display part 201 can display how a washing method changes by changing a value of a strength setting level.

The GUI operation display part 201 provided in the washing machine according to the present embodiment can set a value of the strength setting value in a range of a minimum value (level 0) to a maximum value (level 4). Further, the GUI display portion 304 superimposes indications indicating currently set strength setting levels to display as GUIs in the frame of the wash button 204. More specifically, a GUI of a range from a minimum value of the strength setting level to this currently set strength setting level is displayed with different colors to indicate a range of the currently set strength setting level in the area of the wash button 204. Consequently, it is possible to indicate that a value of the currently set strength setting level is level 2. Further, the range of the value of the strength setting level which can be changed is indicated by allocating the strength setting scale 401.

A motion of the finger 402 of the user when the strength setting level is set changes from a state illustrated in FIG. 13 to a state illustrated in FIG. 14. More specifically, as illustrated in FIG. 13, with the finger 402 put in the vicinity of a boundary (level line) between a range indicating the currently set strength setting level and a range to which the strength setting level is not set, the boundary is dragged in the upper direction of the strength setting scale 401 (S606). When the user moves and drags the finger 402 as described above, the touch sensing portion 302 senses coordinates (touched coordinates) of the touch operating portion 301 area touched by the finger 402 at predetermined time intervals (about several 10 milliseconds), and sends information related to this sensing result to the controller 303. When obtaining information related to this sensing result from the touch sensing portion 302, the controller 303 determines that the user has performed a drag operation (S607). Further, the controller 303 creates screen data for displaying an operation GUI screen according to the obtained touched coordinates, and causes the memory 306 to store the screen data.

The GUI display portion 304 displays the screen data of the operation GUI screen stored in the memory 306, on the GUI operation display part 201 of the operation display part 4 per screen update timing (S608).

In this case, when the user drags the finger 402 to a scale position indicating level 4 and releases the finger 402 ("YES" in step S609), the touch sensing portion 302 senses that the finger 402 has been released. Note that releasing is an operation of separating the finger from an operation target touched by the finger 402. Further, the touch sensing portion 302 sends to the controller 303 release information indicating that the finger 402 has been released, and coordinates of the touch operating portion 301 indicating the position at which the finger 402 has been released. Further, the controller 303 obtains these pieces of information. The controller 303 creates screen data of a GUI screen in which a strength setting value of "wash" is updated to level 4, and displays the GUI screen on the GUI display portion 304 based on the screen data (S610). As illustrated in FIG. 14, an indication in this case indicates a state where a color of the wash button 204 is changed up to the scale position of level 4 and the indication of the strength setting level is extended to level 4.

Further, when the change (level 2 to level 4) of the strength setting level of the washing step is determined, indications indicating a setting range of the strength setting level displayed as a GUI on the GUI operation display part 201 and a value of the set strength setting level disappear. That is, the controller 303 controls the GUI display portion 304 to make the indications indicating the setting range of the strength setting level and the value of the set strength setting level disappear, and change various settings to carry out the washing step at the set strength setting level. Thus, changing the strength setting of the washing step is finished (not illustrated).

Figure 16:
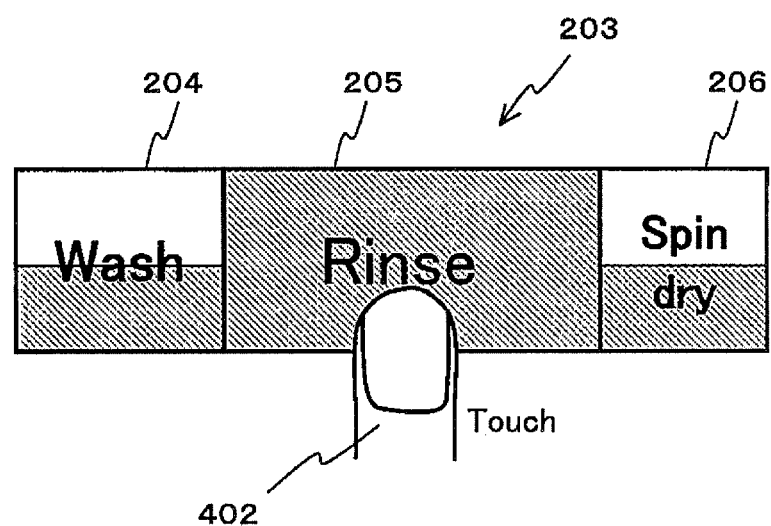
FIG. 16 is a view illustrating a display example of the step setting part when a strength setting level of the rinsing step is changed in the washing machine according to Embodiment 2 of the present embodiment.
Figure 17:
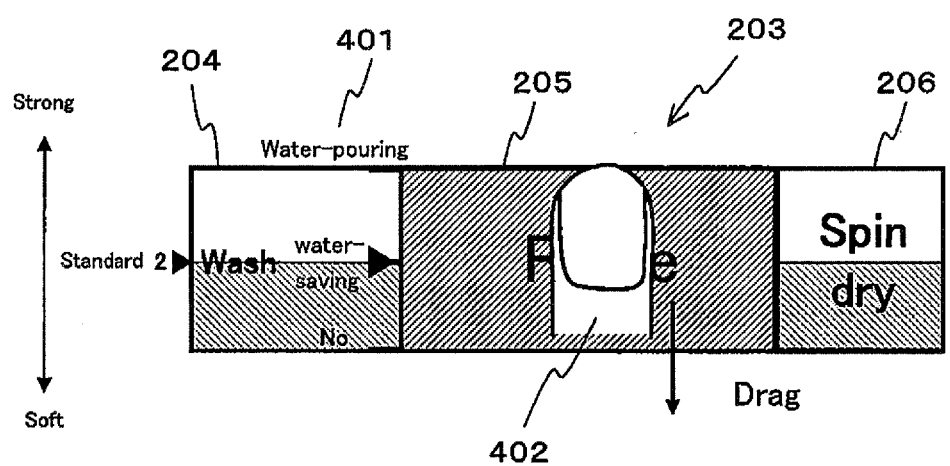
FIG. 17 is a view illustrating a display example of the step setting part when the strength setting level of the rinsing step is changed in the washing machine according to Embodiment 2 of the present embodiment.
Figure 18:
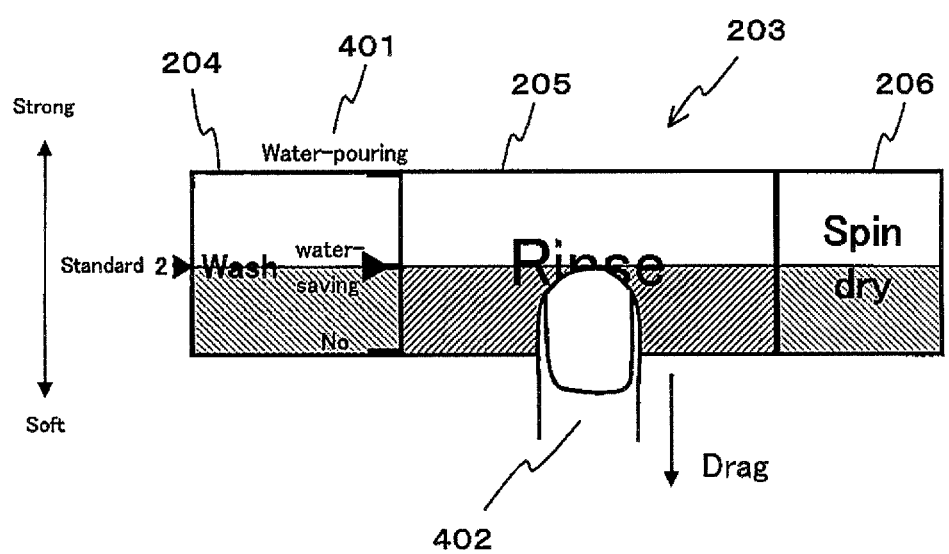
FIG. 18 is a view illustrating a display example of the step setting part when the strength setting level of the rinsing step is changed in the washing machine according to Embodiment 2 of the present embodiment.
Figure 19:
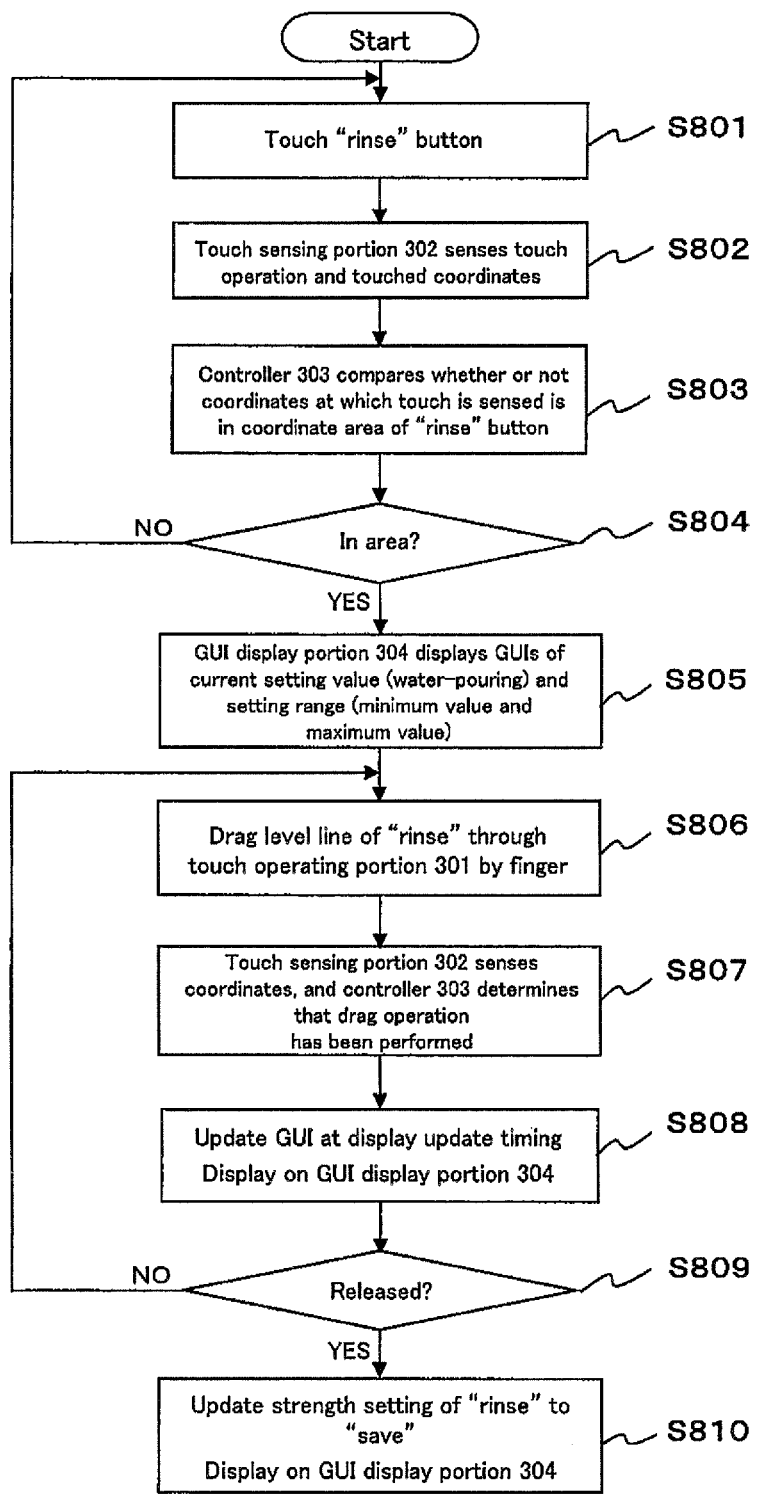
FIG. 19 is a flowchart illustrating an example of an operation of changing the strength setting of the rinsing step by performing the touch operation on the step setting part illustrated in FIGS. 12 to 14.

Next, an operation of changing a strength setting of rinsing and a function of this operation will be described with reference to FIGS. 16 to 19. FIGS. 16 to 18 are views illustrating display examples of the step setting part 203 when the strength setting level of the rinsing step is changed in the washing machine according to Embodiment 2 of the present embodiment. FIG. 19 is a flowchart illustrating an example of an operation of changing the strength setting level of the rinsing step by performing the touch operation on the step setting part illustrated in FIGS. 12 to 14.

When a strength setting level of the rinsing step is changed, as illustrated in FIG. 16, the user touches the touch operating portion 301 area of the rinse button 205 of the step setting part 203 by the finger 402 (S801).

When the user touches by the finger 402 the touch operating portion 301 area, similarly to the washing step, the touch sensing portion 302 senses a user's touch operation and simultaneously senses touched coordinates which are touched, and outputs the coordinates to the controller 303 (S802).

When receiving the touched coordinates sensed by the touch sensing portion 302, the controller 303 reads information of a coordinate area of the display region of the rinse button 205 stored in the memory 306. Further, the controller 303 compares this coordinate area and the received touched coordinates, and determines whether or not the coordinate area of the display region of the rinse button 205 has been touched (S803 and S804).

When determining that the touched coordinates in the above coordinate area ("YES" in step S804), the controller 303 reads a value of the standard setting set to the rinsing step of the automatic course, and the settable range of the strength setting from the memory 306. Further, the GUI display portion 304 causes a GUI operation display part 201 to display GUIs of the standard setting value and the settable range read from the controller 303. Note that, the rinsing step is different from the washing step in that the strength setting of rinsing allows selection of the rinsing method instead of a level numerical value of the washing step. That is, the operation display part 4 of the washing machine according to the present embodiment vary various settable items for the strength setting according to each step of the washing course.

In the rinsing step according to Embodiment 2 of the present embodiment, it is possible to select no rinsing, water-saving rinsing (a method of storing water in a washing tub and performing rinsing while rotating the washing tub), and water-pouring rinsing (a method of rotating the washing tub and performing rinsing while pouring water in the washing tub). Further, indications of the setting range of the strength setting are arranged in order from an item of a lower rinsing force and from the bottom to the top, and can be selected. Thus, the setting range of the strength setting is displayed to allow the user to intuitively select a higher rinsing force or a lower rinsing force.

More specifically, as illustrated in FIG. 17, the GUI display portion 304 displays a GUI of the strength setting scale 401 indicating the strength setting of the rinsing step of the current washing course, in the vertical direction at the left of the display position of the rinse button 205. A minimum value of the strength setting scale 401 in this case corresponds to "no" rinsing and the maximum value corresponds to "water-pouring" rinsing. Further, as illustrated in FIG. 17, in the present embodiment, the currently set strength setting is water-pouring rinsing. Therefore, the GUI display portion 304 superimposes and displays on the rinse button 205 an indication whose color is changed up to the position of "water-pouring" of the strength setting scale 401 (S805).

Further, as illustrated in FIG. 18, when the user drags the finger 402 touching the rinse button 205 in the lower direction of the strength setting scale 401 (S806), the touch sensing portion 302 senses the touched coordinates of the touch operating portion 301 area touched by the finger 402 at predetermined time intervals similarly to the above. Furthermore, the touch sensing portion 302 sends information of the touched coordinates sensed at the predetermined time intervals, to the controller 303. When obtaining this information, the controller 303 determines that the user performs a drag operation (S807). Further, the controller 303 creates screen data for displaying an operation GUI screen according to the touched coordinates, and causes the memory 306 to store the screen data. The GUI display portion 304 displays the screen data of the operation GUI screen stored in the memory 306, on the GUI operation display part 201 of the operation display part 4 per screen update timing (S808).

In this case, when the user drags the finger 402 to a scale position indicating "water-saving" rinsing and releases the finger 402 ("YES" in step S809), the touch sensing portion 302 senses that the finger 402 has been released. Further, the touch sensing portion 302 sends to the controller 303 release information indicating that the finger 402 has been released, and coordinates of the touch operating portion 301 indicating the position at which the finger 402 has been released. Furthermore, the controller 303 obtains these pieces of information. The controller 303 creates screen data for displaying a GUI screen in which a strength setting of "rinse" is updated to "water-saving" rinsing, and displays the GUI screen on the GUI display portion 304 based on the screen data (S810). In this case, as illustrated in FIG. 18, a display position of the indication of the strength setting is changed from "water-pouring" rinsing to "water-saving" rinsing (S810).

Further, when the change (water-pouring to water-saving) of the strength setting of the rinsing step is determined, the indications of the strength setting range and the set strength setting ("water-saving" rinsing) displayed as GUIs on the GUI operation display part 201 disappear. That is, the controller 303 controls the GUI display portion 304 to make the indications of the strength setting range and the set strength setting disappear, and changes various settings to carry out the rinsing step at the set strength setting. Thus, changing the strength setting of the rinsing step is finished.

Although not illustrated, upon setting the washing step and setting the rinsing step, a display color indicating a setting range of a strength setting is changed so that the user can easily and intuitively recognize a strength setting of which step is changed when the user changes the strength setting. Further, instead of changing a display color, a display pattern (hatching) or a position indicating each setting range may be changed and displayed. Note that, changing and displaying a position indicating a setting range of the strength setting means, for example, displaying one of setting ranges of the washing setting and the rinsing setting at an upper side of the step setting part 203 and the other at the lower side, or displaying the setting ranges to be distinguished by superimposing the setting ranges.

Embodiment 2 according to the present embodiment has been described using the washing step and the rinsing step as examples. However, it is also possible to change the strength setting of the spin-drying step likewise. In the case of the spin-drying step, the strength setting can be represented by strength setting levels of the washing step or the number of times of rotations of a motor of the washing tub.

Indications of a strength setting level may vary between the respective steps. However, the strength setting levels may be arranged in one direction such as the vertical direction and displayed so as to allow the user to perform an intuitive operation. Note that, in this vertical direction, higher and lower strength setting levels only need to be associated with higher and lower display positions of the strength setting.

Further, it has been described that a current setting value which is a value of a strength setting before a change matches with the standard setting value. However, this current setting value and the standard setting value do not need to match at all times. For example, this current setting value may be a setting value of a strength setting which is minimum or maximum. Further, there may be employed a configuration of separately displaying GUIs of a setting value of a change target strength setting and the standard setting value of each step defined according to each washing course.

Furthermore, a display mode to display GUIs of the standard setting value and a settable range of the strength setting only needs to be expressed in a format which is added to the step setting part 203 including the setting button indicating each step of the washing operation, and is not limited to shapes of GUIs according to Embodiment 1 and Embodiment 2 of the present embodiment. Still further, a timing at which indications disappear is not limited, either. Moreover, after the strength setting is changed, a level value of the strength setting set in an arbitrary step by the step setting part 203 may be left displayed.

In addition, the setting range of the strength setting displayed in response to a touch operation is calculated based on sensing information of a fabric amount sensing portion 307, a setting value of a fabric quality setting portion 308 and a washing course, and is displayed as a GUI. Further, it is possible to receive a user's operation. Furthermore, there may be employed a configuration in which, when the clothes amount sensed by the fabric amount sensing portion 307 is small, a strength setting range of each step of a washing operation may be reduced and displayed to perform a washing operation while saving more energy.

The operation display part 4 may also be configured to display a smaller strength setting range of the spin-drying step and receive a user's operation when the fabric quality setting portion 308 sets delicate clothes. According to this configuration, the washing machine can prevent clothes from being damaged by performing a spin-drying operation more than necessary, and optimally control an operation while saving energy.

Further, the operation display part 4 of the washing machine according to the present embodiment can change a strength setting of each step by performing a touch operation in the vertical direction as described in the configuration according to Embodiment 2, and, in addition, change a time setting by performing a touch operation in the horizontal direction as described in the configuration according to Embodiment 1.

Figure 20:
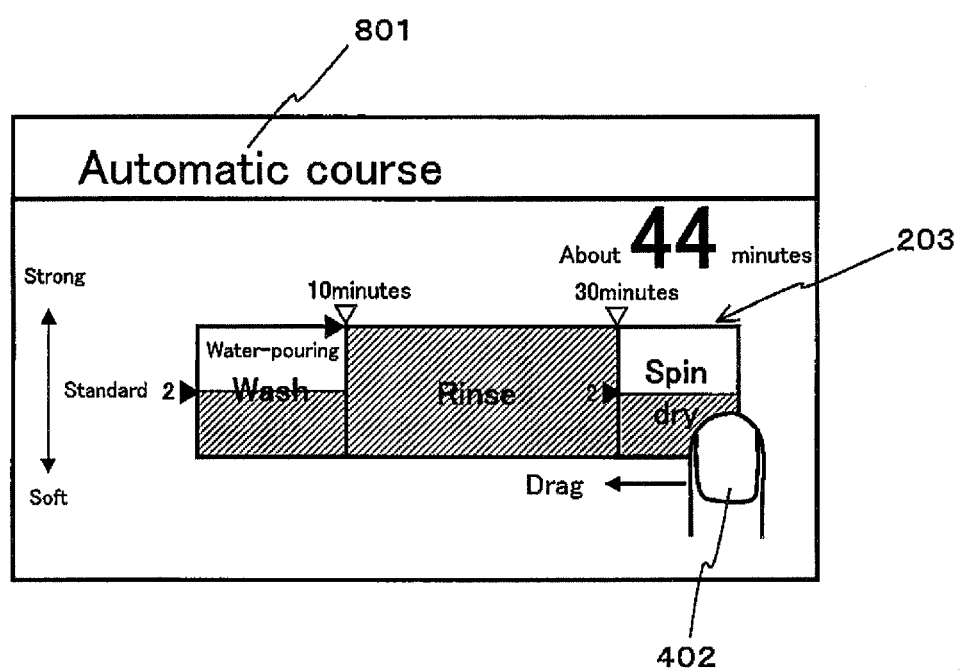
FIG. 20 is a view illustrating a display example of the step setting part when the strength setting level of each step and an operating time are changed in the washing machine according to Embodiment 2 of the present embodiment.

More specifically, as illustrated in FIG. 20, when the user touches the right end of the step setting part 203 by the finger 402, a value of the currently set strength setting is displayed in the vertical direction of each step. Meanwhile, a current setting value (total sum indication) of an operating time of each step is displayed in the horizontal direction of the step setting part 203. Further, an estimated operating time of a washing operation is largely displayed at an upper right. FIG. 20 is a view illustrating a display example of the step setting part when the strength setting level of each step and the operating time are changed in the washing machine according to Embodiment 2 of the present embodiment.

In this case, when the user performs an operation of dragging the finger 402 in the left direction (in the other words, when user sets a short washing operation), the entire time of the washing operation becomes short, and a setting time of each step of washing, rinsing and spin-drying and the strength setting are changed in conjunction with each other. That is, the setting time of each step of washing, rinsing and spin-drying and the strength setting are optimally changed in conjunction with each other such that a washing operation is finished at a desired time.

Figure 21:
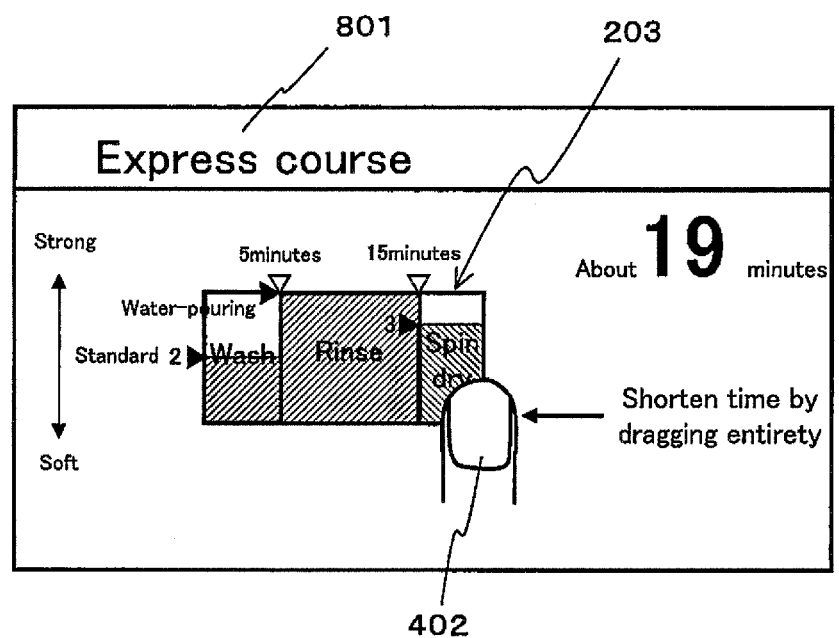
FIG. 21 is a view illustrating a display example of the step setting part when the strength setting level of each step and the operating time are changed in the washing machine according to Embodiment 2 of the present embodiment.

In the case of Embodiment 2 of the present embodiment, the entire time of the washing operation is changed from 44 minutes to 19 minutes as illustrated in FIG. 21. Further, the strength setting level of the spin-drying step is automatically changed from 2 to 3 in response to the change of the selected operating time. Thus, the operation display part 4 can change settings of the operating time and the strength setting in conjunction with each other to perform the control satisfying a user's intention. Further, simultaneously, a washing course 801 is changed from the "automatic course" to the "express course" according to the setting changed by the user. FIG. 21 is a view illustrating a display example of the step setting part when the strength setting level of each step and the operating time are changed in the washing machine according to Embodiment 2 of the present embodiment.

Note that, controlling the above strength setting and operating time setting of each step in conjunction with each other varies depending on the washing course 801 the user desires. For example, when the user desires the automatic course and shortens the set operating time, the user performs control of increasing the strength setting level of at least one or more steps. In contrast, when the set washing operating time is extended, the user sets a low strength setting level of at least one or more steps according to a user's intention to perform washing with a sufficient period of time.

Further, it is possible to cause the memory 306 to store, for example, a rinsing method ("water-pouring" rinsing and "water-saving" rinsing) and the number of times of rinsing such that values of a strength setting and an operating time setting of the rinsing step change in conjunction with a change amount of the strength setting of the washing step before the change to the strength setting after the change. Furthermore, it is possible to perform control likewise in conjunction with other steps, and a configuration of changing setting values of a strength setting and an operating time setting in conjunction with each other is employed. According to this configuration, it is possible to set the strength or set the operating time of another step to reflect a user's setting intention only by, for example, setting the strength setting of a given step or setting an operating time setting. Thus, it is possible to set each step related to a washing operation with smaller man-hours, and improve convenience and operability.

Further, when the setting of each step is changed by performing control in conjunction with each step, the GUI operation display part 201 notifies by way of a pop-up display a message saying that "A setting is changed. Do you want to change to express course for optimal washing?", and notifies that the washing course is changed to a more optimal control course (not illustrated).

The configuration of controlling the above strength setting and operating time setting in conjunction with each other according to the selected washing course 801 has been employed. However, the configuration is not limited to such a configuration. For example, there may be employed a configuration of performing control in conjunction with each step according to information of a fabric amount sensed by the fabric amount sensing portion 307 and fabric quality set by the fabric quality setting portion 308.

More specifically, when the fabric amount is larger than the standard amount in view of information of the sensed fabric amount, and if an operating time is set to be shortened, a strength setting level of the strength of the washing step is set to increase. Alternatively, when the fabric quality setting portion 308 sets fabric quality of delicate clothes, and if the operating time is set to be shortened, the strength setting level is not set to be increased. However, when fabric quality of normal clothes is set, and if the operating time is set to be shortened, the strength setting level is set to increase. Thus, there may be employed a configuration of adequately controlling a strength setting and an operating time setting in conjunction with each other according to the fabric amount and fabric quality.

Figure 22:
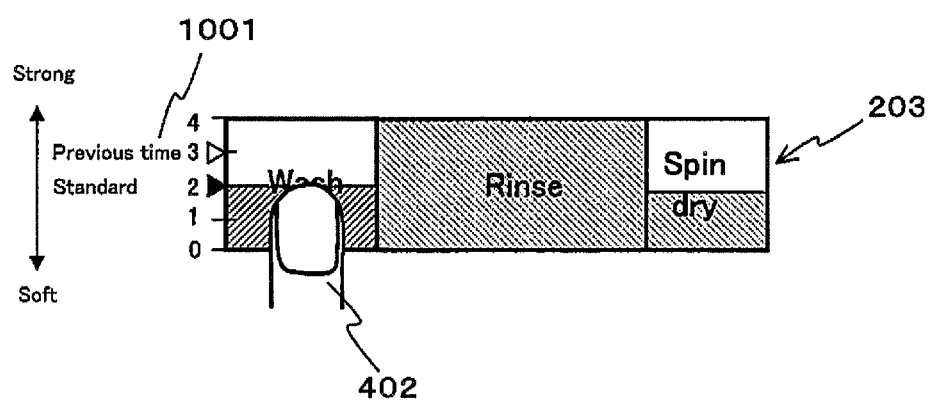
FIG. 22 is a view illustrating another display example of the step setting part in the washing machine according to Embodiment 2 of the present embodiment.

Further, the configuration of clearly indicating a standard setting value (default value) by displaying a value of a strength setting level and "standard" on the GUI operation display part 201 has been described in Embodiment 2 of the present embodiment. However, there may be provided a function of displaying a previous setting value 1001 in addition to the standard setting value as illustrated in FIG. 22. FIG. 22 is a view illustrating another display example of the step setting part in the washing machine according to Embodiment 2 of the present embodiment. Whether or not to display the previous setting value 1001 in addition to the standard setting value can be easily switched by changing a user's setting. By displaying the previous setting value 1001, the user can have a more specific image of what washing operation the user desires this time and set the washing operation compared to a previous washing operation, and convenience improves.

The GUI operation display part 201 described above in Embodiment 1 and Embodiment 2 displays each step continuously arranged in a time sequence on the step setting part 203. Further, there has been employed a configuration of superimposing information related to the strength setting such as level values of the strength setting and a settable range, on these indications to be displayed. That is, there has been employed a configuration of expressing the first display image according to the present invention indicating an operating time of each step and the second display image according to the present invention indicating the degree of the strength related to the function (strength setting) as one common display image.

However, a display mode of the step setting part 203 is not limited thereto. For example, there may be employed a configuration of individually displaying an indication of an operating time of each step and strength setting level values as separate display images. In this case, the first display image and the second display image according to the present invention are expressed as separate display images.

Figure 23:
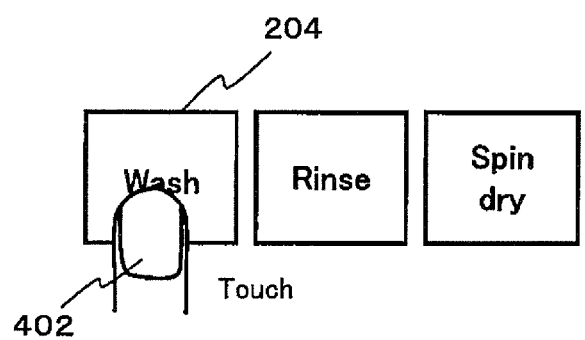
FIG. 23 is a view illustrating another display example of the step setting part according to the present embodiment.

Further, the step setting part 203 may be configured to independently display strength setting buttons for setting strengths of the steps, and each strength setting button may be a GUI which is extended or shortened in response to a user's touch operation. More specifically, the GUI operation display part 201 employs a configuration independently including the strength setting buttons of the steps of washing, rinsing and spin-drying as illustrated in FIG. 23. FIG. 23 is a view illustrating another display example of the step setting part according to the present embodiment.

Figure 24:
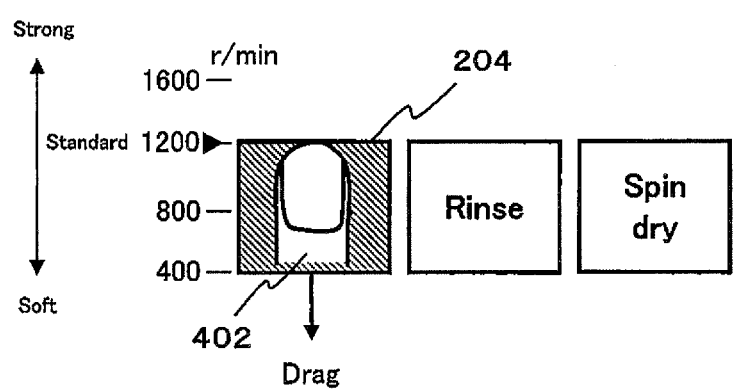
FIG. 24 is a view illustrating another display example of the step setting part according to the present embodiment.

In this case, when the user touches the wash button 204 by the finger 402, a strength setting range of the washing step of a selected washing course is displayed on the left of the wash button 204 (see FIG. 24). In an example illustrated in FIG. 24, the strength setting range and a value of a strength setting in this strength setting range are indicated by the number of times of rotations of the washing tub. FIG. 24 is a view illustrating another display example of the step setting part according to the present embodiment.

Figure 25:
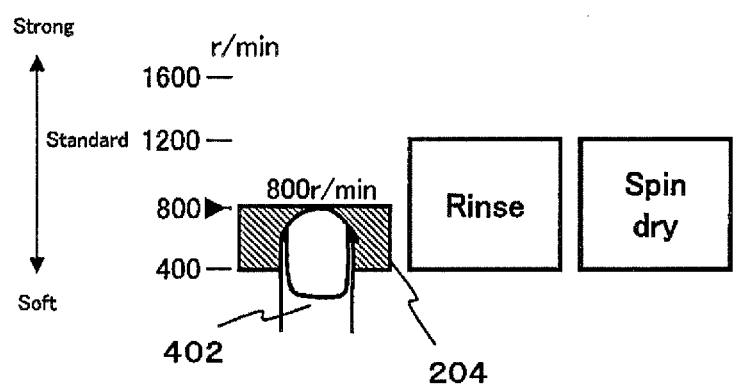
FIG. 25 is a view illustrating another display example of the step setting part according to the present embodiment.

Here, it is assumed that, in a state where the user touches the wash button 204, the user drags the finger 402 in a direction from 1200 times of rotations of the current setting value 403 (standard setting value) to 800 times of rotations, and changes the strength setting of the washing step (FIG. 25). In this case, the display dimension of the wash button 204 is reduced to a position which represents a value set by dragging the finger 402. FIG. 25 is a view illustrating another display example of the step setting part according to the present embodiment. Further, in contrast, when the user drags the finger 402 to increase the value of the strength setting, the display dimension (size) of the wash button 204 is extended.

The wash button 204 independently provided on the GUI operation display part 201 has been described as an example. However, values to change include not only a value of the strength setting of each step but also a value which defines an operating time or the number of times of operations. Further, in the present embodiment, buttons which change values of strength settings have been represented as rectangular shapes. However, the buttons may be circular shapes, elliptical shapes or icons. Note that, the same effect is obtained as long as there is employed a configuration of indicating a setting range in the vertical direction in the figure when the value of the strength setting is changed so that the value of the strength setting can be set by the user moving the touched finger 204 in the vertical direction. Further, although not illustrated in FIGS. 23 to 25 in particular, there is employed a configuration of indicating a setting range in the horizontal direction in the figure when an operating time or the number of times of operations is changed so that the operating time or the number of times of operations can be set by the user moving the touched finger 204 in the horizontal direction.

It is possible to set the strengths of the rinsing step and the spin-drying step likewise. Further, a value which is changed by a strength setting may be the number of times of rotations of a motor of the washing tub or a set level value.

Figure 26:
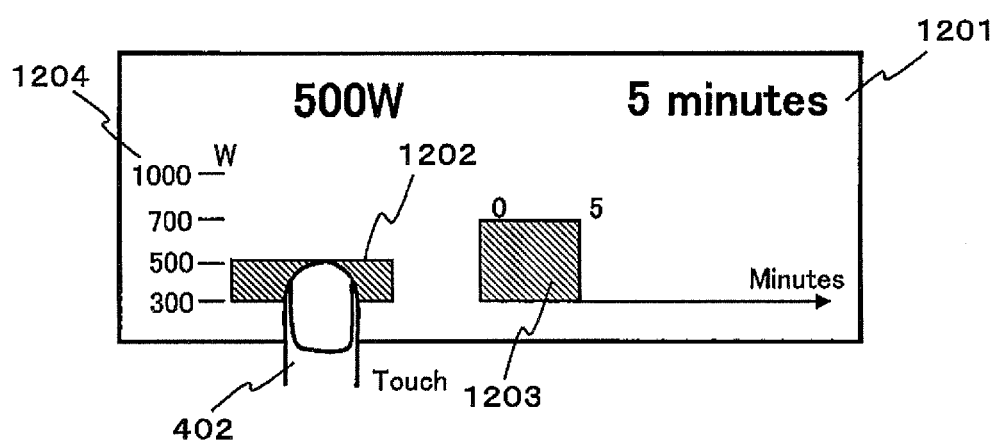
FIG. 26 is a view illustrating an example of the operation display part according to the present embodiment provided in a microwave.
Figure 27:
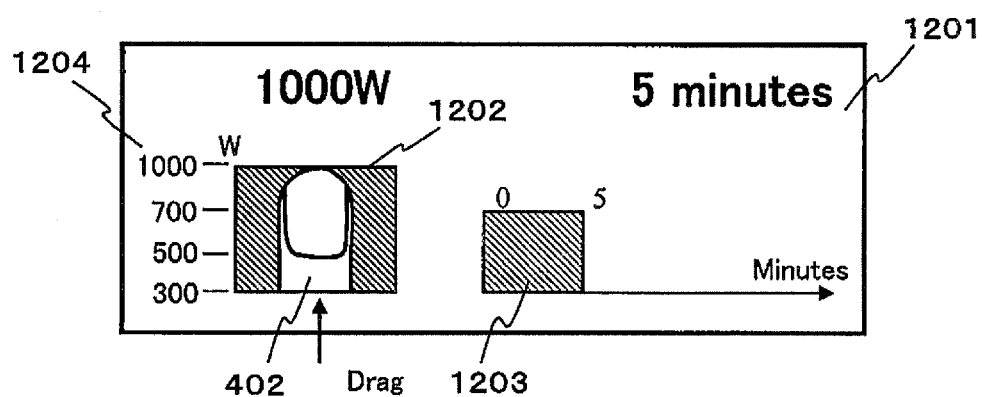
FIG. 27 is a view illustrating an example of the operation display part according to the present embodiment provided in the microwave.

Furthermore, the operation display part 4 according to the present embodiment is also applicable to other home appliances other than the above washing machine. For example, as illustrated in FIG. 26, the operation display part 4 is applicable as the operation display part 4 provided in a home appliance such as a microwave. FIG. 26 is a view illustrating an example of the operation display part 4 according to the present embodiment provided in the microwave. A GUI operation display part 1201 provided in the operation display part 4 of the microwave has the following indications. That is, according to a configuration including the operation display part 4 in the washing machine, the GUI operation display part 201 displays the step setting part 203 including the wash button 204, the rinse button 205 and the spin-dry button 206 as described above. In contrast, according to the configuration including the operation display part 4 in the microwave, the GUI operation display part 1201 displays an output setting button 1202 which sets an output of an electromagnetic wave (strength setting) and a time setting button 1203 which sets an operating time. Further, in the case of an output setting, when the user first touches the output setting button 1202 by the finger 402, a setting range scale 1204 indicating output power (W) of the microwave is displayed as illustrated in FIG. 26. Furthermore, when the user drags the finger 402 in the vertical direction, for example, a GUI indication of the output setting button 1202 is extended in the upper direction and is changed from 500 W to 1000 W as illustrated in FIG. 27. FIG. 27 is also a view illustrating an example of the operation display part 4 according to the present embodiment which is provided in the microwave. In this case, when the finger 402 is released, this change is settled. Further, the user sets the operating time by performing an operation of dragging the time setting button 1203 in the horizontal direction. Furthermore, the set output setting value and operating time are displayed at an upper portion of the operation display part 1201, in this way, user's convenience is improved.

Still further, although not illustrated, the operation display part 4 can be likewise configured to set strengths such as adjustment of fire power of a stove of an IH cooking heater and set a temperature of an air-conditioner.

When functioning as the operating device of the washing machine, the operation display part 4 according to the present embodiment includes the GUI display portion 304 which visually displays a strength setting related to the strength of a washing operation for washing clothes. The operation display part 4 further includes the touch operating portion 301 as an input device which can set the strength setting by extending or shortening in, for example, the vertical direction the setting range of the strength setting displayed on the GUI display portion 304. Further, the operation display part 4 includes the memory 306 which stores information related to an extendable setting range of this strength setting. Furthermore, when extending or shortening the setting range of the strength setting of each step, the touch operating portion 301 causes the GUI display portion 304 to display the extendable setting range. Thus, when a value of the strength setting is changed by a touch operation using the touch operating portion 301, the GUI display portion 304 causes the GUI operation display part 201 to display the setting range which can be extended or shortened in, for example, the vertical direction. The setting range is visually displayed in this way, so that the user can intuitively perform an operation. Further, the user can set the strength with smaller man-hours, and operability and convenience improve.

Furthermore, the operation display part 4 can display a setting range which can be extended or shortened in, for example, the vertical direction, and can set the strength by extending or shortening the setting range by a user's touch on the touch operating portion 301. Meanwhile, the operation display part 4 can also be configured to display a setting range which can be extended or shortened in, for example, the horizontal direction, and set the operating time by extending or shortening the setting range by a user's touch on the touch operating portion 301. Consequently, the operation display part 4 can make a strength setting and an operating time setting, which are required in many home appliances, in accordance with a control target in two axes of the vertical direction and the horizontal direction. Consequently, it is possible to more intuitively perform an operation with smaller man-hours.

Further, when changing the setting by extending or shortening the strength setting, the operation display part 4 also changes the time setting in conjunction with this change. In contrast, when changing the setting by extending or shortening the time setting, the operation display part 4 also changes the strength setting in conjunction with this change. Thus, the user can manually set whether the strength is high or low or whether the operating time is long or short according to a user's preference. Further, the operation display part 4 changes setting values of setting items (an operating strength, an operating time and the like) related to control of a home appliance in conjunction with each other such that the setting values become optimal, and visually displays these changes. Consequently, the user can more intuitively operate settings of setting items related to control of a home appliance, so that convenience improves. Further, since the user does not have to separately change a strength setting and a time setting, the strength setting and the time setting can be set with smaller man-hours.

Furthermore, when the washing machine has a plurality of washing courses, the operation display part 4 stores setting values of an operating time of each step and a strength setting of each step, and setting ranges of the setting values in the memory 306 per set washing course. Consequently, the operation display part 4 can display an optimal setting value of each step and a settable range of this setting value according to a selected washing course. Consequently, the user can optimally control the washing machine.

Further, by displaying a setting range of a strength setting as a scale or a strength setting level as described above, the strength level of the strength setting is easily recognized, and convenience is enhanced.

Furthermore, by displaying a standard setting position when a setting range is displayed, to what degree the strength setting is increased or decreased can more easily be recognized based on the standard setting position.

Still further, by displaying a previous setting position when a setting range is displayed, to what degree the strength setting is increased or decreased with respect to a previous finishing result can more easily be recognized.

Moreover, it is possible to indicate setting ranges of each of a plurality of steps in different units. Hence, for example, the strength set in the washing step is the number of times of rotations of the motor which rotates a pulsator provided in the washing tub, and the strength set in the rinsing step is a rinsing mode (e.g. water-pouring rinsing or water-saving rinsing), and a strength can be set using a different reference in each step. Consequently, the user can easily recognize the strength setting.

Further, in the washing machine including each step such as washing, rinsing and spin-drying, when a strength setting of each step is changed by a user's touch operation using the touch operating portion 301, the GUI display portion 304 obtains a setting range corresponding to each step from the memory 306, and displays a setting range which can be extended or shortened in, for example, the vertical direction. Thus, it is possible to visually display the extendable setting range of each step. Consequently, the user can perform an intuitive operation and set the strength with smaller man-hours, so that convenience and operability improve.

Further, the washing machine according to the present embodiment is configured to display a setting range which can be extended or shortened in, for example, the vertical direction in response to a user's touch operation using the touch operating portion 301, and set strengths of washing, rinsing and spin-drying by extending or shortening this setting range. In contrast, the washing machine is also configured to display a setting range which can be extended or shortened in, for example, the horizontal direction, and set the time of each step by extending or shortening this setting range. Thus, it is possible to make the strength setting and the time setting of each step of washing in different axis directions such as the vertical direction and the horizontal direction. Consequently, the user can more intuitively perform an operation with smaller man-hours, and convenience improves.

Further, the washing machine according to the present embodiment is configured to sense a fabric amount for washing by the fabric amount sensing portion 307, and calculate a setting range of the strength setting of each step related to the washing. Consequently, the washing machine according to the present embodiment allows the user to set the strength to carry out a power-saving and efficient operation without taking an operating time more than necessary and increasing an operation strength.

Further, the operation display part 4 according to the present embodiment is configured to calculate a setting range of a strength setting of each step related to washing by setting fabric quality for the washing by the fabric quality setting portion 308. Consequently, the operation display part 4 according to the present embodiment can more optimally control each step according to fabric quality of clothes or the like to be washed, present an adequate strength setting range to the user, and allow the user to set the strength in the strength setting range.

Note that, an indication of an operating time related to washing is an estimated time, which is changed by types of clothes or concentration of clothes to one side. Therefore, an indication of a remaining time of the operating time may be changed during a washing operation.

Further, the washing machine according to the present embodiment is configured such that the fabric amount sensing portion 307 senses a clothes amount after washing is started by pushing the start key. However, a fabric amount sensing timing is not limited thereto, and may be performed when a power-on button of the washing machine is pushed or when a washing course is set by the washing course selection button 207. Thus, the fabric amount sensing portion 307 can sense a clothes amount upon start of washing, so that the washing machine according to the present embodiment can calculate and display a more accurate operating time. Further, it is also possible to set the operating time of each step based on a calculated operating time, so that convenience further improves.

Further, the configuration in which the washing step includes three steps of washing, rinsing and spin-drying has been described. However, the washing step is not limited thereto. The washing step may include a sterilizing/deodorizing step or a drying step.

Further, the present invention has been described as the washing machine.

However, the present invention is also applicable to home appliances in general or electric machines and appliances which operate based on control data including a plurality of steps.

Further, the touch operating portion 301 has been described as the capacitive touch panel. However, the touch operating portion 301 may be another touch panel such as a resistive touch panel which enables touch and drag operations.

Further, an indication of a GUI indicating a setting range has been described with scales in units of 5 minutes in case of time and in units of 1 time in case of the number of times. However, the unit is not limited to this unit width. A setting range may be displayed with an indication of a level. That is, the setting range only needs to allow the user to intuitively understand the time required for each step, and may be expressed by applying a pattern or varying colors to the setting range.

Further, as the operation of changing the operating time of each step, the operation of extending or shortening the time by dragging the boundary between the steps has been described. However, instead of dragging a boundary, it is also possible to drag an arbitrary position in a display region displaying each step button to the left and the right to shorten or extend the time. Consequently, convenience to perform an operation of changing the time further improves.

Further, when extending the operating time, there may be employed a configuration of scrolling a liquid crystal screen to the left and the right when the setting range of the operating time extends out of the liquid crystal screen. Furthermore, it is also possible to change a reduced scale of a time to display, and display the time such that the time fits in the liquid crystal screen.

Still further, the operating device according to the present embodiment may be a smartphone, a tablet computer or a PC which enables a touch operation and performs wireless communication. Thus, home appliances can be remotely operated, and convenience improves.

Moreover, a home appliance including the operating device according to the present embodiment may be other than a washing machine. In particular, home appliances which perform an operation action including a plurality of steps preferably include the operating device. Home appliances other than a washing machine are, for example, a laundry dryer, a dish washer, a microwave, an oven, a rice cooker, an IH cooking device, an air-conditioner remote controller, health-care equipment such as a massage chair and a robotic vacuum cleaner. Further, the operating device may be used for FA devices and medical devices.

Furthermore, it can be said that the operation display part (operating device) 4 and the washing machine including the operation display part 4 employ the following configurations.

The operating device according to the present invention is an operating device which operates a home appliance which performs an operation action including at least the first step and the second step, and the operating device includes a display portion which visually displays time durations of the first step and the second step, an operating portion which extends or shortens the time durations of the first step and the second step displayed on the display portion, and a memory which stores extendable settable ranges of the first step and the second step, wherein, when the operating portion sets the time durations to extend or shorten, the display portion displays an extendable setting range stored in the memory in the vicinity of the boundary between the first step and the second step.

Further, when the operating portion changes settings of the time durations of the steps in a home appliance including at least the first step and the second step, an extending/shortening range corresponding to the step of changing the settings of the time durations is visually displayed by displaying an extendable setting range stored in the memory in the vicinity of the boundary between the first step and the second step. Consequently, convenience and operability improve. Further, an extending/shortening range corresponding to each step is displayed, so that it is possible to change a time in a different optimal range corresponding to steps and a state of a home appliance.

Furthermore, the operating device according to the present invention having the above configuration may employ a configuration in which, when the operating portion sets the time durations to extend or shorten, the display portion displays a scale or a level indicating an extendable predetermined unit.

Still further, a range of a time setting is displayed by providing a scale or a level numerical value per predetermined unit, so that feedback performance of time settings of steps increases, and operability and convenience improve.

Moreover, the operating device according to the present invention having the above configuration may employ a configuration in which the display portion displays different scales or levels according to a step whose time duration is set to extend or shorten.

Further, by displaying a scale or a level corresponding to each step of a home appliance whose time duration is set to extend or shorten, it is possible to change a unit width or a unit of time. Consequently, it is possible to display an extendable setting range as an optimal indication for the time required for a step, and improve convenience and operability.

Further, the operating device according to the present invention having the above configuration may employ a configuration in which, when the operating portion sets the time durations to extend or shorten, the display portion visually displays an estimated time required for an operating time which changes following the setting.

Still further, the estimated time required for each step or all steps is visually displayed and the user can perform an operation and change the setting while checking the estimated time, so that operability and convenience improve.

Moreover, the operating device according to the present invention having the above configuration may employ a configuration in which the display portion varies a display mode according to a step which is set to extend or shorten by the operating portion.

Further, by changing a display mode (colors and patterns) according to a step, it is possible for the user to intuitively recognize in which step a setting is changed and prevent an erroneous operation, and improve operability and convenience.

Furthermore, the operating device according to the present invention having the above configuration may employ a configuration in which the memory stores a change amount of the second step in conjunction with a change of the extending/shortening setting of the first step, or a change amount of the first step in conjunction with a change of the extending/shortening setting of the second step, and the display portion displays the change amount of the second step in conjunction with the first step which is set to extend or shorten by the operating portion, or displays the change amount of the first step in conjunction with the second step which is set to extend or shorten by the operating portion.

Still further, the change amount of the second step corresponding to the change amount of the change of the setting of the first step is stored in the memory. Therefore, a setting value of the second step in conjunction with the change of the setting of the first step is also changed and setting times of related to steps are changed. Consequently, it is possible to optimally control a home appliance and improve operability and convenience. Further, similarly, the change amount of the first step corresponding to the change amount of the change of the setting of the second step is stored in the memory. Consequently, similarly, it is possible to optimally control a home appliance and improve operability and convenience.

Further, a washing machine according to the present invention may include an operating device which includes a display portion which visually displays time durations of washing steps such as washing, rinsing and spin-drying, an operating portion which extends or shortens the time durations of the steps displayed on the display portion, and a memory which stores a setting range of the time of each step per washing course, wherein, when the operating portion sets the time durations to extend or shorten, the display portion displays an extendable setting range stored in the memory in the vicinity of the boundary between a step which is set to extend or shorten and a next step.

Further, when a washing course is selected, the time duration of each step of the washing course and an entire required time are visually displayed, and, when an operation of touching a display portion of each step is performed, a setting range stored per step of each washing course in advance is displayed on the left and the right of the boundary between the touched step and the next step. Consequently, it is possible for the user to intuitively recognize the entire time required for washing, and easily change the time of a desired step. Simultaneously, it is possible to perform control in the setting range optimal for the step of each washing course, and more optimally control the washing course.

Further, the washing machine according to the present invention having the above configuration may employ a configuration including the operating device which includes a fabric amount sensing portion of laundry, wherein the setting range of each step of the washing is calculated based on the washing course set in advance and fabric amount information sensed by the fabric amount sensing portion.

Furthermore, the fabric amount sensing portion is provided to calculate and display an optimal step time value calculated based on the washing course and the fabric amount information, and the setting range which can be used by the user, so that convenience further improves. Further, it is possible to display and set an optimal setting range based on sensed fabric amount information of laundry, and improve power-saving performance without performing unnecessary control.

Furthermore, the washing machine according to the present invention having the above configuration may employ a configuration including the operating device which includes a fabric quality setting portion of laundry, wherein the setting range of each step of the washing is calculated based on the washing course set in advance and fabric quality information set by the fabric quality setting portion.

Still further, since the fabric quality setting portion is provided to calculate and display an optimal step time value calculated based on the fabric quality information set by the user and the washing course, and the setting range which can be used by the user, convenience further improves. Further, it is possible to display and set an optimal setting range based on the set fabric quality information of laundry, and display the setting range according to fabric quality, so that functionality and convenience of the washing machine improve.

Further, the washing machine according to the present invention having the above configuration may employ a configuration including the operating device which, when a step time of one of the washing steps such as washing, rinsing and spin-drying is changed, changes the setting to an adequate washing course according to the changed time.

Furthermore, when a step time of one of the washing, rinsing and spin-drying steps is changed, a washing course based on which the washing machine is controlled is changed to an optimal washing course according to the changed setting time. Consequently, it is possible to improve functionality and convenience of the washing machine.

Further, the washing machine according to the present invention having the above configuration may employ a configuration in which course change contents are notified to the user when the washing course is changed.

Furthermore, when the washing course is changed, it is notified that the washing course based on which the washing machine is controlled is changed. Consequently, it is possible for the user to recognize what the current washing course is, and improve convenience.

Further, it can also be said that the operation display part (operating device) 4 and the washing machine including the operation display part 4 employ the following configurations.

The operating device according to the present invention is an operating device which operates a home appliance, and may employ a configuration including a display portion which visually displays a strength setting image for controlling a target object, an operating portion which extends or shortens in the vertical direction the strength setting image displayed on the display portion, and a memory which stores an extendable range, wherein, when the operating portion extends or shortens the strength setting image, the display portion displays an extendable setting range stored in the memory.

Further, when the operating portion changes the strength setting for controlling the target object in a home appliance, the setting range corresponding to the control is obtained from the memory and the extendable setting range is displayed in the vertical direction on the display portion. Consequently, it is possible to visually display the setting range, allow an intuitive operation, and set the strength with smaller man-hours, so that convenience and operability improve. Further, when there is a plurality of control steps, it is possible to change the setting in an optimal setting range according to the step and the state of the home appliance.

Furthermore, the operating device according to the present invention having the above configuration is the operating device which operates a home appliance, and may employ a configuration including a display portion which visually displays a strength setting and a time setting for controlling a target object, an operating portion which extends or shortens the strength setting displayed on the display portion, in the vertical direction and extends or shortens the time setting in the horizontal direction, and a memory which stores extendable ranges of the strength setting and the time setting, wherein the display portion displays in the vertical direction the extendable setting range stored in the memory when the operating portion extends or shortens the strength setting, and displays in the horizontal direction the extendable setting range stored in the memory when the operating portion extends or shortens the time setting.

Still further, the operating portion sets the strength by displaying and extending or shortening the setting range in the vertical direction, and sets the time by displaying and extending or shortening the setting range in the horizontal direction. Consequently, it is possible to set two axes of the strength setting and the time setting of a control target which are set in many home appliances, and more intuitively and easily perform an operation with smaller man-hours, and further improve convenience.

Further, the operating device according to the present invention having the above configuration may employ a configuration in which the memory stores a change amount of the time setting in conjunction with a change of the extending/shortening setting of the strength setting, or a change amount of the strength setting in conjunction with a change of the extending/shortening setting of the time setting, and the display portion displays the change amount of the time setting in conjunction with the strength setting which is set to extend or shorten by the operating portion, or displays the change amount of the strength setting in conjunction with the time setting which is set to extend or shorten by the operating portion.

Furthermore, when the extending/shortening setting of the strength setting is changed, the time setting is changed in conjunction with this change or, when the extending/shortening setting of the time setting is changed, the strength setting is changed in conjunction with this change. Consequently, it is possible to manually set a strength direction or a time direction according to a user's preference, optimally change setting values related to control in conjunction with each other and visually display the setting values, and more intuitively set an operation and improve convenience. Further, since the user does not have to separately change a strength setting and a time setting, the strength setting and the time setting can be easily set with smaller man-hours.

Furthermore, the operating device according to the present invention having the above configuration employs a configuration which includes a plurality of control courses for controlling a home appliance, wherein, when the operating portion extends or shortens the strength setting, the display portion displays an extendable setting range stored per control course.

Still further, in the case of a home appliance including a plurality of control courses (control sequences), a setting range stored in the memory is displayed per set control course. Consequently, it is possible to display an optimal setting range for a selected control course, perform optimal control and further improve user's convenience.

Further, the operating device according to the present invention having the above configuration may employ a configuration in which, when the operating portion sets the strength setting to extend or shorten, the display portion displays a scale or a level indicating an extendable predetermined unit.

Furthermore, by displaying a scale or a level as an indication of a setting range of the strength setting, it is possible to more intelligibly display the setting range for the user, and improve convenience.

Still further, the operating device according to the present invention having the above configuration may employ a configuration in which the display portion also displays a standard setting position when displaying the setting range.

Moreover, by displaying the standard setting position when the setting range is displayed, it is possible for the user to more easily recognize to what degree the strength setting needs to be increased or decreased compared to the reference.

Further, the operating device according to the present invention having the above configuration may employ a configuration in which the display portion also displays a previous setting position when displaying the setting range.

Furthermore, by displaying the previous setting position when the setting range is displayed, it is possible for the user to more intelligibly recognize to what degree the strength setting needs to be increased or decreased compared to the previous finishing result.

Still further, the operating device according to the present invention having the above configuration may employ a configuration which includes at least two or more different controlling steps, and which changes a unit of the setting range according to each step.

Moreover, a setting range is indicated in units which are different between a plurality of controlling steps. Consequently, even when different axes of strengths to set such as the number of times of rotations of the motor in the washing step and a rinsing method of the rinsing step are set to control, it is possible to intelligibly display the setting range to the user and further improve convenience.

Further, a washing machine according to the present invention employs a configuration which includes an operating device including a display portion which visually displays strength settings of washing steps such as washing, rinsing and spin-drying, an operating portion which extends or shortens in the vertical direction the extending/shortening settings of the steps displayed on the display portion, and a memory which stores a setting range of each step time per washing course, wherein, when the operating portion sets the strength settings of each step to extend or shorten, the display portion displays an extendable setting range stored in the memory, on the display portion which displays the step.

Furthermore, when the operating portion changes the strength setting for controlling washing of clothes in the washing machine which includes the control steps such as washing, rinsing and spin-drying, the setting range corresponding to each step is obtained from the memory and the extendable setting range is displayed in the vertical direction on the display portion. Consequently, it is possible to visually indicate the setting range, perform an intuitive operation, and set the strength with smaller man-hours, so that convenience and operability improve. Further, it is possible to change the setting in the optimal setting range according to the state of each step.

Furthermore, a washing machine according to the present invention employs a configuration which includes an operating device including a display portion which visually displays strength settings and time settings of washing steps such as washing, rinsing and spin-drying, an operating portion which extends or shortens the strength settings of the steps displayed on the display portion, in the vertical direction and extends and shortens the time settings in the horizontal direction, and a memory which stores setting ranges of the strength settings and the time settings of each step per washing course, wherein the display portion displays the extendable setting range stored in the memory, in the vertical direction of the display portion indicating the step when the operating portion sets the strength setting of each step to extend or shorten, and displays the extendable setting range stored in the memory in the horizontal direction when the operating portion sets the time setting to extend or shorten.

Furthermore, the operating portion sets the strength of washing control such as washing, rinsing and spin-drying by displaying and extending or shortening the setting range in the vertical direction, and sets the time of each step by displaying and extending or shortening the setting range in the horizontal direction. Consequently, it is possible to set two axes of the strength setting and the time setting of washing control, and more intuitively and easily perform an operation with smaller man-hours, and further improve convenience.

Further, the washing machine according to the present invention having the above configuration may employ a configuration which includes the operating device including a fabric amount sensing portion of laundry, wherein the setting range of each step of the washing is calculated based on the washing course set in advance and the fabric amount information sensed by the fabric amount sensing portion.

Furthermore, the fabric amount sensing portion senses a fabric amount for washing and calculates a setting range of a strength setting of the washing step. Consequently, it is possible to change the setting range according to the fabric amount, perform more optimal control and allow the user to efficiently set the strength.

Further, the washing machine according to the present invention having the above configuration may employ a configuration which includes the operating device including a fabric quality setting portion of laundry, wherein the setting range of each step of the washing is calculated based on the washing course set in advance and the fabric quality information set by the fabric quality setting portion.

Furthermore, the fabric quality setting portion sets fabric quality of laundry to calculate a setting range of a strength setting of the washing step. Consequently, it is possible to change the setting range according to the fabric quality, perform more optimal control and allow the user to efficiently set the strength.

Multiple improvements and other embodiments of the present invention are obvious for those skilled in the art in view of the above description. Accordingly, the above description should be interpreted as exemplary embodiments, and is provided to those skilled in the art for the purpose of teachings of the best mode for carrying out the present invention. It is possible to substantially change details of the structure and/or the function of the present invention without departing from the spirit of the present invention.

INDUSTRIAL APPLICABILITY

The present invention includes a GUI operation display part which controls a touch panel, and is generally applicable to home appliances such as washing machines and cooking appliances which operate based on control data including a plurality of steps.

What is claimed is:

1. An operating device which sets each of a plurality of steps in an electric machine and appliance which executes an operation action selected from a plurality of operation actions including the plurality of steps, the operating device comprising:
    a first display portion which displays each of first display images having a size in a first direction correlated with a duration of an operating time of each of the steps;
    a first operating portion which extends or shortens the size of each of the first display images in the first direction displayed on the first display portion in response to a user's operation input;
    an operating time determination part which determines the operating time of each step according to the size of each of the first display images in the first direction displayed on the first display portion; and
    a first memory which stores information of a settable range of the operating time of each of the steps set for each of the operation actions,
    wherein, when an operating time of a step included in a predetermined operation action is set in the predetermined operation action, the first display portion displays, based on the information stored in the first memory, a settable range of the operating time of the step in the predetermined operation action as a range of the first direction together with each of the first display images, and
    when a change of setting of the operating time is determined, the settable range displayed on the first display portion disappears.

2. An operating device which sets each of a plurality of steps in an electric machine and appliance which executes an operation action selected from a plurality of operation actions including the plurality of steps, the operating device comprising:
    a first display portion which displays each of first display images having a size in a first direction correlated with a duration of an operating time of each of the steps;
    a first operating portion which extends or shortens the size of each of the first display images in the first direction displayed on the first display portion in response to a user's operation input;
    an operating time determination part which determines the operating time of each step according to the size of each of the first display images in the first direction displayed on the first display portion; and
    a first memory which stores information of a settable range of the operating time of each of the steps set for each of the operation actions,
    wherein, when an operating time of a step included in a predetermined operation action is set in the predetermined operation action, the first display portion displays, based on the information stored in the first memory, a settable range of the operating time of the step in the predetermined operation action as a range of the first direction together with each of the first display images,
    the operating device further comprising:
    a second display portion which displays each of second display images having a size in a second direction correlated with a degree of a strength related to a function executed in each of the steps, the second direction being different from the first direction;
    a second operating portion which extends or shortens in the second direction the size of each of the second display images displayed on the second display portion in response to a user's operation input;

a strength determination part which determines the strength related to the function executed in each step according to a size of each of the second display images in the second direction displayed on the second display portion; and a second memory which stores information of a settable range of the strength set for each of the operation actions and related to the function executed in each step, wherein, when the strength related to the function of a step included in a predetermined operation action is set in the predetermined operation action, the second display portion displays, based on the information stored in the second memory, a settable range of the strength in the predetermined operation action as a range of the second direction together with each of the second display images.

3. The operating device according to claim 2, further comprising:

a third memory which, when the size of one of the first display images and the second display images is changed, stores a change amount of the size of the other which is changed in conjunction with the changed size; and a third display portion which, when the size of one of the first display images and the second display images is changed, reads from the third memory the change amount of the size of the other which is changed in conjunction with the changed size, and displays the change amount.

4. The operating device according to claim 3, wherein when the first operating portion sets an operating time by extending or shortening the size of each of the first display images in the first direction, the first display portion displays a predetermined unit at which each of the first display images is extended or shortened, and when the second operating portion sets the strength by extending or shortening the size of each of the second display images in the second direction, the second display portion displays a predetermined unit at which each of the second display images is extended or shortened.

5. The operating device according to claim 4, wherein, in the first display portion and the second display portion, a unit which represents the settable range is varied according to a step of extending or shortening the size of each of the first display images and the size of each of the second display images by the first operating portion and the second operating portion.

6. The operating device according to claim 1, wherein, when the first operating portion extends or shortens the size of each of the first display images in the first direction, an operation action to select is changed to an operation action optimal for the operating time determined by the operating time determination part according to the extended or shortened size in the first direction.

7. The operating device according to claim 2, wherein, when the first operating portion extends or shortens the size of each of the first display images in the first direction, an operation action to select is changed to an operation action optimal for the operating time determined by the operating time determination part according to the extended or shortened size in the first direction.

8. The operating device according to claim 1, wherein the first display portion displays a total operating time of a predetermined operation action in such a manner that the first display images are displayed on the first display portion in the predetermined operation action so as to be adjacent to one another and lined up in the first direction, the first display images each having the size in the first direction, the size being correlated with the duration of the operating time of a corresponding one of the steps included in the predetermined operation action.

9. The operating device according to claim 2, wherein the first display portion displays a total operating time of a predetermined operation action in such a manner that the first display images are displayed on the first display portion in the predetermined operation action so as to be adjacent to one another and lined up in the first direction, the first display images each having the size in the first direction, the size being correlated with the duration of the operating time of a corresponding one of the steps included in the predetermined operation action.

* * * * *